US008010164B1

(12) United States Patent
Sennett et al.

(10) Patent No.: US 8,010,164 B1
(45) Date of Patent: Aug. 30, 2011

(54) DETERMINATION OF EAS DELIVERY

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1297 days.

(21) Appl. No.: 11/532,323

(22) Filed: Sep. 15, 2006

(51) Int. Cl.
*H04M 1/00* (2006.01)

(52) U.S. Cl. ............ 455/567; 455/404.1; 455/404.2; 455/466; 455/414.1; 455/414.2; 455/414.3; 455/456.1

(58) Field of Classification Search .... 455/404.1–404.2, 455/466, 414.1–414.3, 456.1
See application file for complete search history.

(56) References Cited

U.S. PATENT DOCUMENTS

| | | | |
|---|---|---|---|
| 5,742,904 A | 4/1998 | Pinder et al. | |
| 5,878,351 A * | 3/1999 | Alanara et al. | 455/466 |
| 6,052,591 A * | 4/2000 | Bhatia | 455/445 |
| 6,606,502 B1 * | 8/2003 | Chung Kam Chung et al. | 455/466 |
| 6,745,021 B1 * | 6/2004 | Stevens | 455/404.1 |
| 7,039,386 B2 * | 5/2006 | Kolsrud | 455/404.1 |
| 7,054,612 B2 * | 5/2006 | Patel | 455/404.1 |
| 7,084,775 B1 * | 8/2006 | Smith | 340/601 |
| 7,113,793 B2 | 9/2006 | Veerasamy et al. | |
| 7,181,204 B2 * | 2/2007 | Alfano et al. | 455/423 |
| 7,426,203 B1 | 9/2008 | McNamara et al. | |
| 7,509,124 B2 * | 3/2009 | O'Neil | 455/432.2 |
| 7,519,384 B2 * | 4/2009 | Vaittinen et al. | 455/522 |
| 2003/0104804 A1 * | 6/2003 | Iwata | 455/414 |
| 2004/0137885 A1 * | 7/2004 | Sarkkinen et al. | 455/414.1 |
| 2004/0203562 A1 * | 10/2004 | Kolsrud | 455/404.1 |
| 2005/0261012 A1 * | 11/2005 | Weiser | 455/466 |
| 2006/0083240 A1 * | 4/2006 | Hofstaedter et al. | 370/390 |
| 2006/0126556 A1 * | 6/2006 | Jiang et al. | 370/328 |
| 2007/0135090 A1 * | 6/2007 | Martin et al. | 455/404.2 |

* cited by examiner

*Primary Examiner* — Rafael Pérez-Gutiérrez
*Assistant Examiner* — Lameka Kirk
(74) *Attorney, Agent, or Firm* — Woodcock Washburn LLP

(57) ABSTRACT

Various options for determining the delivery mechanism to be used for the distribution of emergency alerts, such as Emergency Alert System (EAS) messages, include determining if broadcast technologies are supported. If broadcast technology is supported, alerts are provided in accordance therewith. If broadcast technology is not supported, alert messages are provided, via the Short Message Service (SMS), to geographic locations in which subscribers are located. In accordance with another option, if broadcast technology is not supported, SMS based alert messages are routed to subscribers via a Mobile Switching Center (MSC).

20 Claims, 18 Drawing Sheets

DETERMINATION OF EAS DELIVERY

TECHNICAL FIELD

The technical field generally relates to communications systems and more specifically relates to routing emergency alerts, such as those issued by the Emergency Alert System ("EAS").

BACKGROUND

Existing broadcast technologies, such as Cell Broadcast, Multimedia Broadcast/Multicast Service ("MBMS"), and video broadcast, (e.g., Digital Video broadcast-Handheld ("DVB-H"), IP Multicast, and MediaFLO), for example, have been proposed to support emergency alert notifications. A problem is that an alert area associated with an emergency alert may contain cell sites which can support broadcast and cell sites which can not. And, broadcast technologies may never be available in some cellular sites.

SUMMARY

A system and method for the determination of the delivery mechanisms to be used for the distribution of emergency alerts, such as Emergency Alert System (EAS) messages, is described herein. Options are provided. In accordance with one option, if broadcast technology is supported, alerts are provided in accordance therewith. If broadcast technology is not supported, alert messages are provided, via the Short Message Service (SMS), to geographic locations in which subscribers are located. When an SMS subscriber's mobile device is registered, the subscriber's profile is analyzed to determine if the subscriber wants to receive alert messages via SMS. If the subscriber wants to receive alert messages via SMS, cell sites associated with the current location of the subscriber are utilized to provide alert messages. As the subscriber register's his/her mobile device in other geographic locations, the current location of the subscriber is updated.

In accordance with another option, if broadcast technology is supported, alerts are provided in accordance therewith. If broadcast technology is not supported, SMS based alert messages are routed to subscribers via a Mobile Switching Center (MSC). The MSC receives one alert message and routes that one message to all subscribers known to the MSC. In an example embodiment, an emergency alert message along with an indication of the alert area is received by a processor, such as an emergency alert server. MSCs capable of facilitating cellular coverage for the alert area are determined. Cell ID (cell sites) associated with the MSC are determined, and the alert message is routed to subscribers currently registered in the cell ID (cell site).

BRIEF DESCRIPTION OF THE DRAWINGS

The foregoing summary, as well as the following detailed description, is better understood when read in conjunction with the appended drawings.

DETAILED DESCRIPTION OF ILLUSTRATIVE EMBODIMENTS

An alert area, such as an Emergency Alert System (EAS) area can comprise cellular sites that are capable of supporting broadcasts from broadcast networks and some that are incapable of supporting broadcast networks. In this context, an organization, corporation, association, or the like, broadcasts alert messages to a geographic area. Broadcast networks, include for example, Cell Broadcast, Multimedia Broadcast\Multicast Service (MBMS), and video broadcast, (e.g., Digital Video broadcast-Handheld (DVB-H), IP Multicast, and MediaFLO). As described herein, various delivery mechanisms provide delivery of alert messages to an alert area even if a portion of the area does not support broadcast technologies. In various embodiments, if a portion of the alert area does support broadcast networks, the alert message is delivered via a wireless broadcast network and a broadcast sever. If a portion of the alert area does not support broadcast networks, alert messages are routed to subscribers of SMS based alert messaging via a cellular radio network and a Mobile Switching Center (MSC) and Visitor Location Register (VLR), and/or an SMS Center (SMSC).

Figure 1:
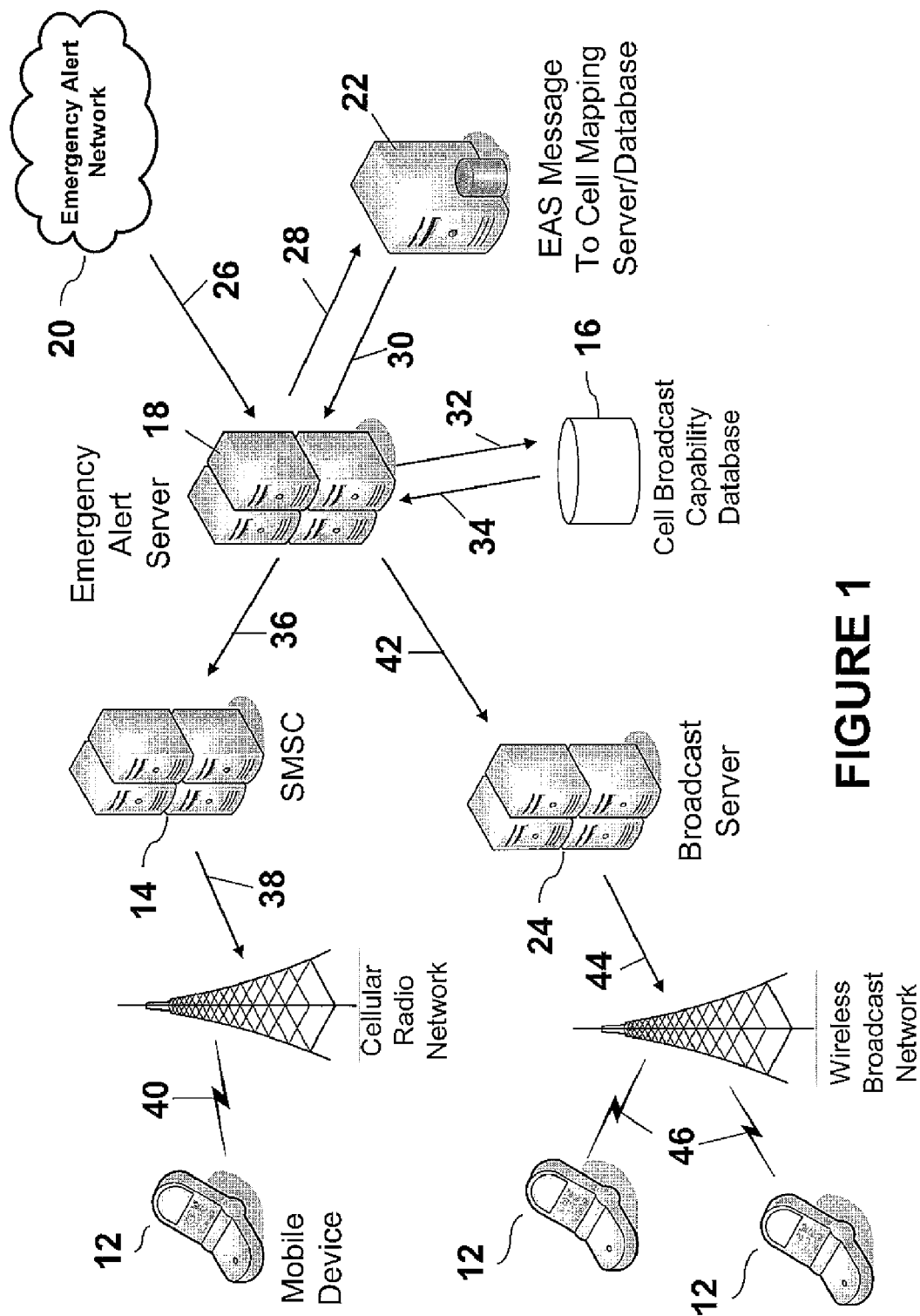
FIG. 1 is a flow diagram of an example process and system for delivering an alert message.

FIG. 1 is a flow diagram of an example process and system for delivering an alert message. At step 26, an Emergency Alert Network 20 provides to an Emergency Alert Server 18 an alert message and an indication of an alert area. In example embodiments, as described in more detail below, the alert area can be defined statically and/or dynamically. A statically defined alert area can be specified in the alert message, utilizing for example, geographic code references such as the Federal Information Processing Standard (FIPS), ZIP codes, and/or the National Weather Service Specific Area Message Encoder (SAME) codes. A dynamically defined alert area can be specified in the alert message, utilizing for example, geometric shapes, such as polygons, formatted in accordance with a World Geodetic System 1984 (WGS-84) format, or the like.

At step 28, the Emergency Alert Server 18 provides a request to an Emergency Alert Service (EAS) message to cell site mapping server/database 22 (referred to herein as the "mapping server") for cell IDs (cell sites) associated with the alert area. As described in more detail below, the mapping server 22 determines (e.g., maps, translates) cell IDs (cell sites) capable of providing cellular coverage to the alert area. In various example embodiments, as described in more detail below, cell IDs capable of providing coverage to the geographic alert area are determined in accordance with the statically and/or dynamically defined alert areas.

Figure 2:
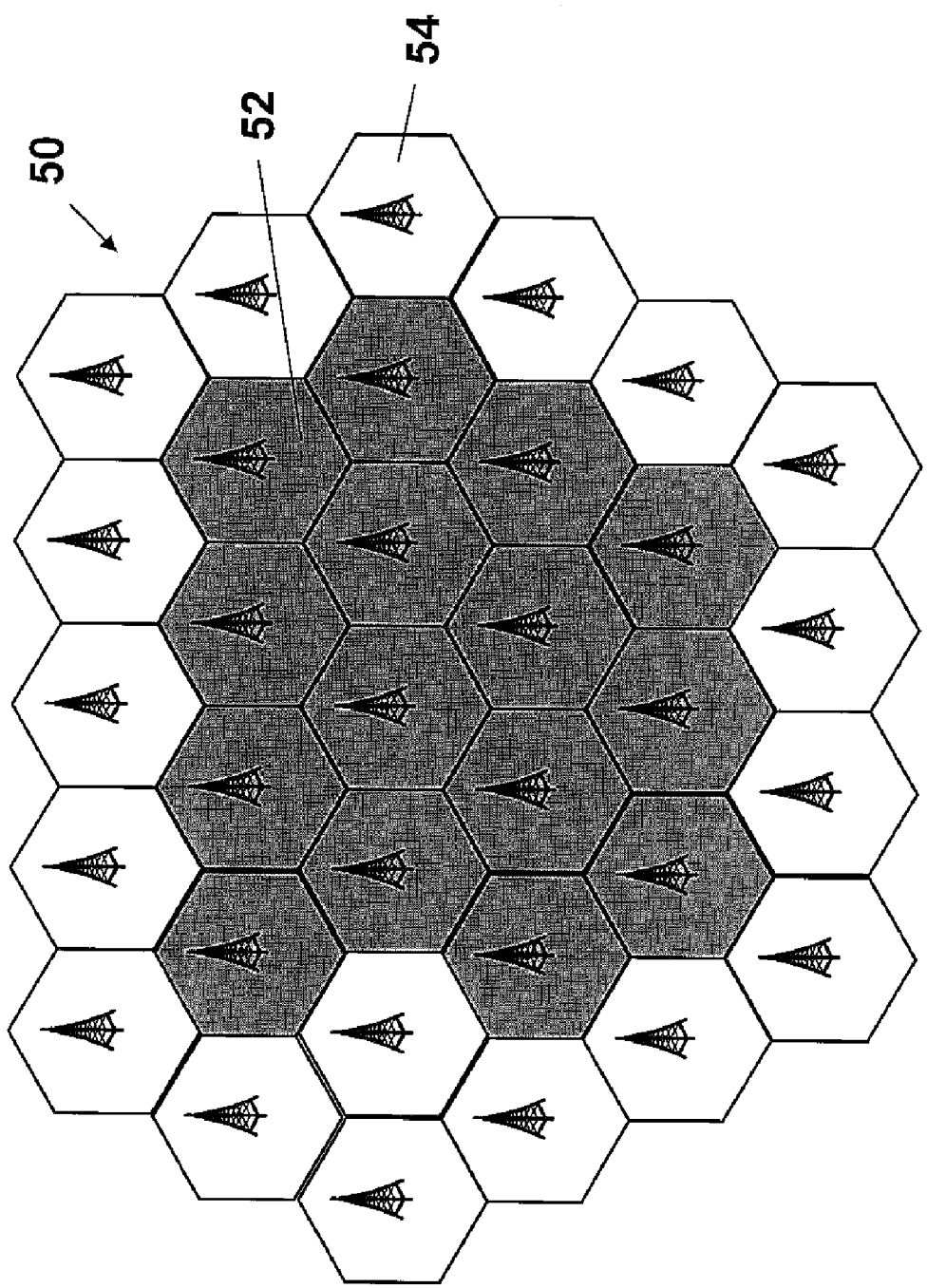
FIG. 2 is an example depiction of cell sites capable of providing cellular coverage to an alert area.

The mapping server 22 provides, at step 30, an indication of the cell sites located in the alert area. That is, the mapping server 22 provides an indication of cell sites capable of providing cellular coverage to the alert area. FIG. 2 is an example depiction of cell sites capable of providing cellular coverage to an alert area. Cell sites 50 represent example geographically contiguous cell sites capable of providing cellular coverage to the alert area and surrounding areas. Shaded cell sites 52 represent cell sites capable of providing cellular coverage to the alert area. Note, only one shaded cell site is labeled 52 for the sake of simplicity. Un-shaded cell sites 54 represent cell sites outside of the alert area. That is, cell sites 54 provide not cellular coverage to the alert area. Note, only one un-shaded cell site is labeled 54 for the sake of simplicity.

Figure 3:
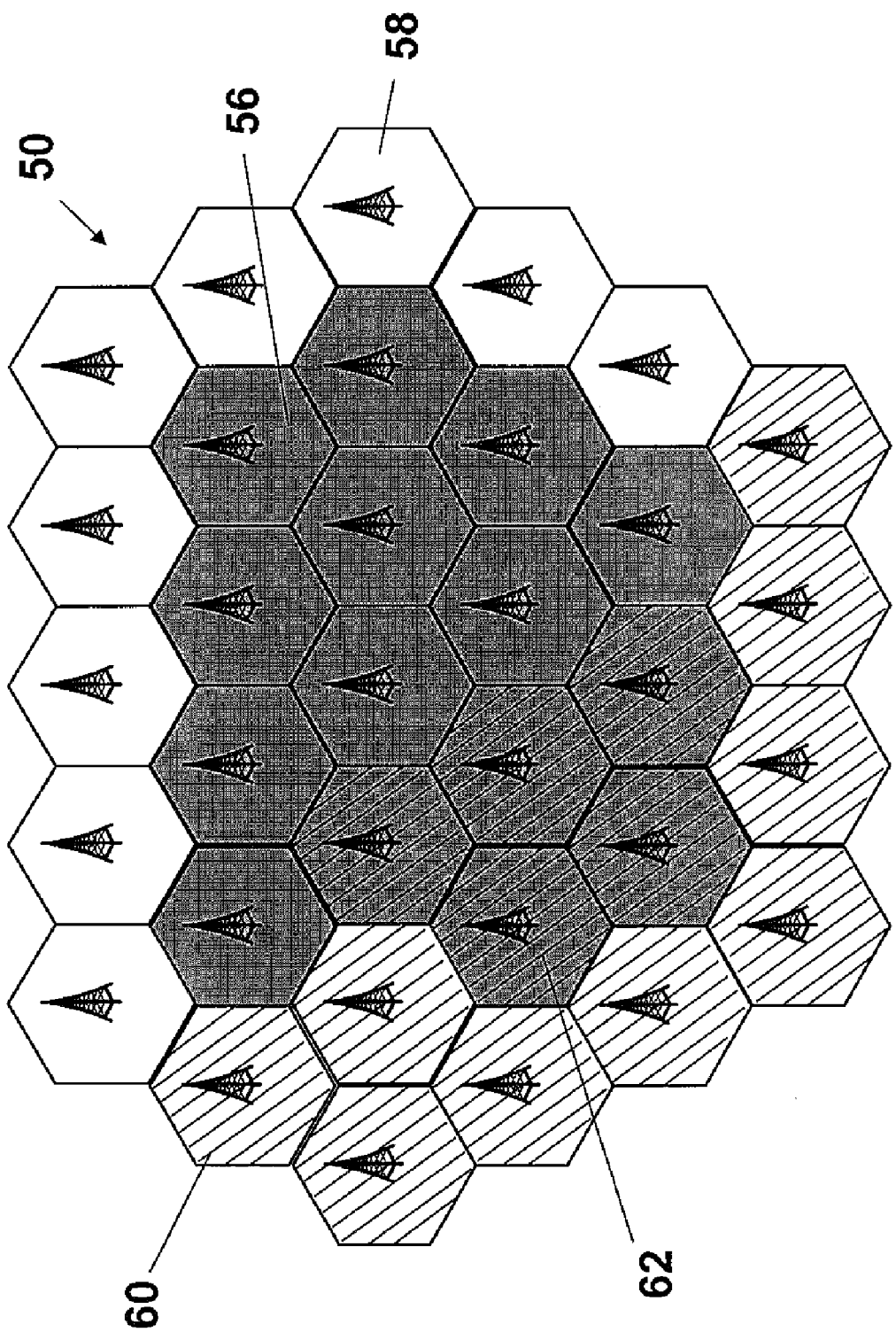
FIG. 3 is an example depiction of the broadcast capabilities of the cell sites depicted in FIG. 2.

Upon receiving (at step 30) the indication (e.g., list) of cell sites capable of providing cellular coverage to the alert area, the Emergency Alert Server 18, determines the broadcast capability of the cell sites received. For example, the Emergency Alert Server 18 determines the broadcast capability of each cell site depicted in FIG. 2. The Emergency Alert Server 18 can determine the broadcast capability of each cell site in accordance with any appropriate means, such as requesting the broadcast capability of each cell site from an appropriate processor. FIG. 3 is an example depiction of the broadcast capabilities of the cell sites depicted in FIG. 2. Cell sites having diagonal lines represent cell sites supporting broadcast technology. Shaded only cell sites 56 represent cell sites that are capable of providing cellular coverage to the alert and are not capable of supporting broadcast technology. Un-shaded only sites 58 represent cell sites that do not provide cellular coverage to the alert area, and are not capable of supporting broadcast technology. Cell sites 60 that are un-shaded and have diagonal lines represent cell sites not providing cellular coverage to the alert area and are capable of supporting broadcast technology. Cell sites 62 that are shaded and have diagonal lines represent cell sites capable of providing cellular coverage to the alert area and capable of supporting broadcast technology. Note, on one each of cell sites 56, 58, 60, and 62 is labeled for the sake of simplicity. In an example embodiment, cell sites are color coded to indication cellular and/or broadcast capabilities.

Referring again to FIG. 1, the Emergency Alert Server 18, at step 42, provides an indication of cell sites within the alert area and supporting broadcast technology (e.g., cell sites 62) to a broadcast server 24. The Emergency Alert Server 18 also provides the alert message to the broadcast server 24, at step 42. The broadcast server 24 instructs the wireless broadcast network to transmit the alert message to the identified cell sites providing coverage to the alert area and supporting broadcast technology (e.g., cell sites 62). At step 46, the broadcast cell sites broadcast the alert message mobile devices 12.

As described in more detail below, subscribers can be identified who are currently registered in cell sites which do not have broadcast capabilities and who are willing to receive SMS based emergency alert message when outside of the broadcast coverage areas. For each of these identifies subscribers, at step 36, the Emergency Alert Server 18 provides to the SMS Center (SMSC) 14 an SMS based alert message. A more detailed description of the SMSC 14 is provided below. Generally however, when a subscriber sends an SMS message (text message) to another subscriber, the mobile device sends the message to an SMSC. The SMSC stores the message and subsequently delivers it to the destination subscriber. In an example embodiment, step 36 occurs concurrently with, or approximately concurrently with, step 42. That is, the Emergency Alert Server 18 provides an indication of cell sites within the alert area and supporting broadcast technology (e.g., cell sites 62) to the broadcast server 24 and provides to the SMSC the SMS based alert message for each identified subscriber at approximately the same time, or as close to the same time as is reasonably practicable.

At step 38, the SMSC 14 provides to the cellular radio network the received SMS base alert message. The cellular radio network transmits, at step 40, the SMS based alert message to mobile devices 12 associated with identified subscribers.

Figure 4:
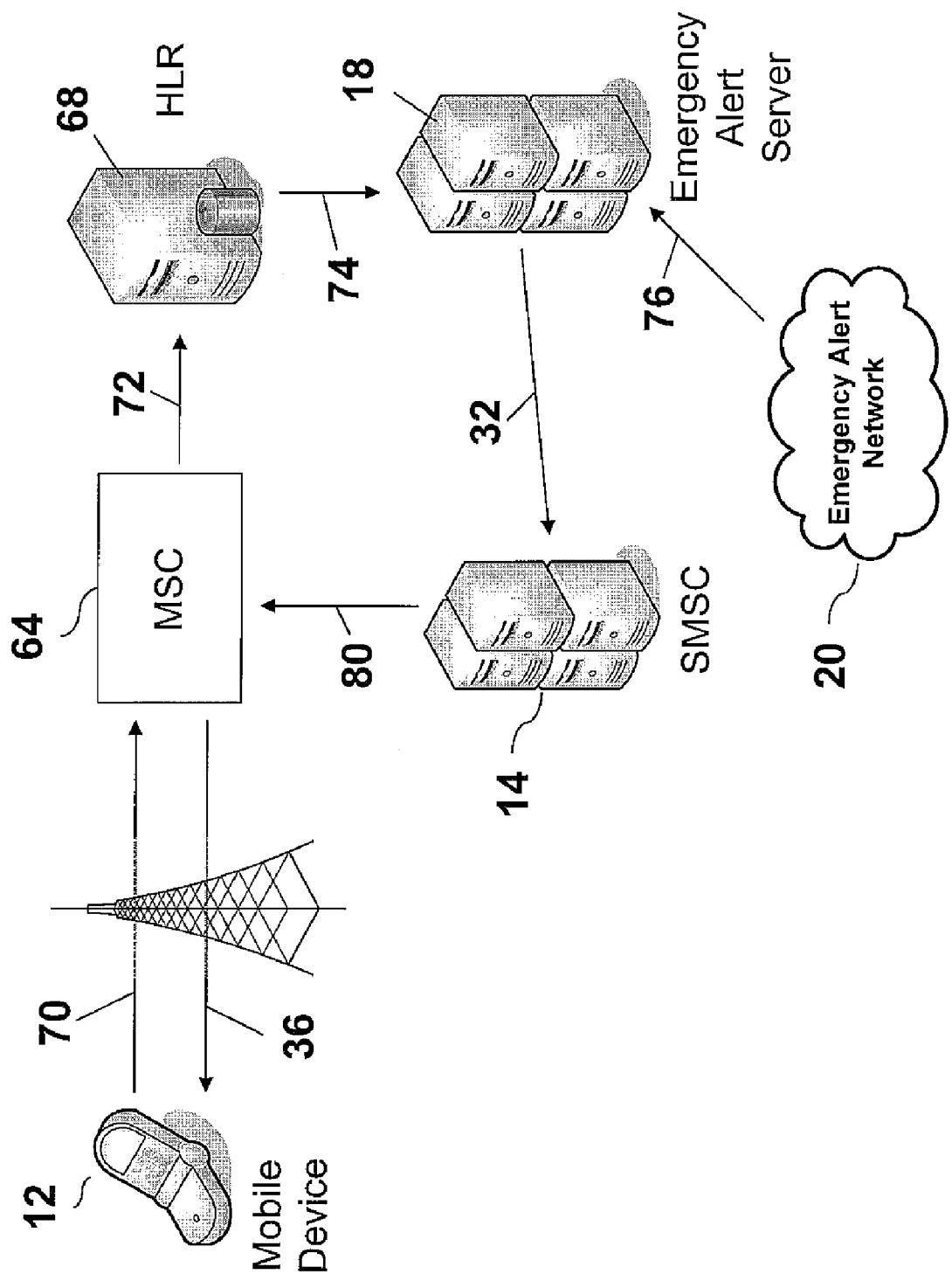
FIG. 4 is a more detailed flow diagram of an example process and system for delivering an SMS based alert message to cell sites in an alert area not capable of supporting broadcast technologies.

FIG. 4 is a more detailed flow diagram of an example process and system for delivering an SMS based alert message to cell sites in an alert area not capable of supporting broadcast technologies. At step 70, the mobile device 12 registers with the MSC 64. The MSC 64, at step 72, provides registration information to the Home Location Register (HLR) 68. A more detailed description of the HLR is provided below. Upon receiving the registration request, the HLR 68 performs well known registration functions. Further, the HLR 68 analyzes the subscriber's profile information contained therein. If the profile information stored in the HLR 68 indicates that the subscriber wants to receive alert messages (e.g., Emergency Alert System, EAS, messages) via SMS, the HLR 68, at step 74, provides an indication thereof along with registration information, to the Emergency Alert Server 18.

In an example embodiment, registration information provided (step 74) by the HLR 68 to the Emergency Alert Server 18 comprises a subscriber ID, such as the subscriber's directory number for example, and an indication of the geographic area in which the subscriber registered, such as the MSC (e.g., cell site). The Emergency Alert Server 18 maintains a list of registered subscribers who want to receive alert messages via SMS. The Emergency Alert Server 18 also maintains a list of the MSCs currently associated with each registered subscriber who wants to receive alerts via SMS.

Each time a mobile device 12 registers with an MSC 64, steps 70, 72, and 74, are performed, and the lists maintained by the Emergency Alert Server 18 are updated. Thus, if a subscriber registers with a first MSC 64 and later registers with a different MSC 64, the Emergency Alert Server 18 updates the information stored therein pertaining to the subscriber, including an identification of the different MSC 64. In this way, the current location of a registered subscriber is maintained. If the HLR 68 determines that a mobile device is no longer registered, the HLR 68 provides an indication thereof to the Emergency Alert Server 18 and the Emergency Alert Server 18 updates accordingly information stored therein pertaining to the subscriber associated with the mobile device.

At step 76, an Emergency Alert Network 20 provides to the Emergency Alert Server 18 an alert message and an indication of an alert area. At this point, the mobile device 12 is registered with the MSC 64. The Emergency Alert Server 18, upon receipt (step 76) of the alert message from the Emergency Alert Network 20, determines cell sites within the alert area. The cell sites providing coverage to the geographic alert area can be determined statically and/or dynamically as described in detail below. Upon determining cell sites capable of providing cellular coverage to the geographic alert area, the Emergency Alert Server 18 compares the list of cell sites capable of providing cellular coverage to the geographic alert area with the list of cell sites associated with subscribers who want to receive alert messages via SMS. The list of cell sites associated with subscribers who want to receive alert messages via SMS is determined by determining the list of cell sites associated with each MSC 64 with which SMS subscribers are registered.

If a match is found as a result of the comparison, for each registered SMS subscriber who wants to receive alert messages via SMS and is registered on a cell site within the specified alert area, the Emergency Alert Server 18 generates an SMS based alert message (e.g., text alert message). The SMS based alert message(s) is provided by the Emergency Alert Server 18 to the SMSC 14 at step 78. At step 80, the SMSC 14 provides the SMS based alert message(s) to the MSC 64. At step 82, the MSC 64 provides the SMS alert message(s) to the mobile device(s) 12.

Figure 5:
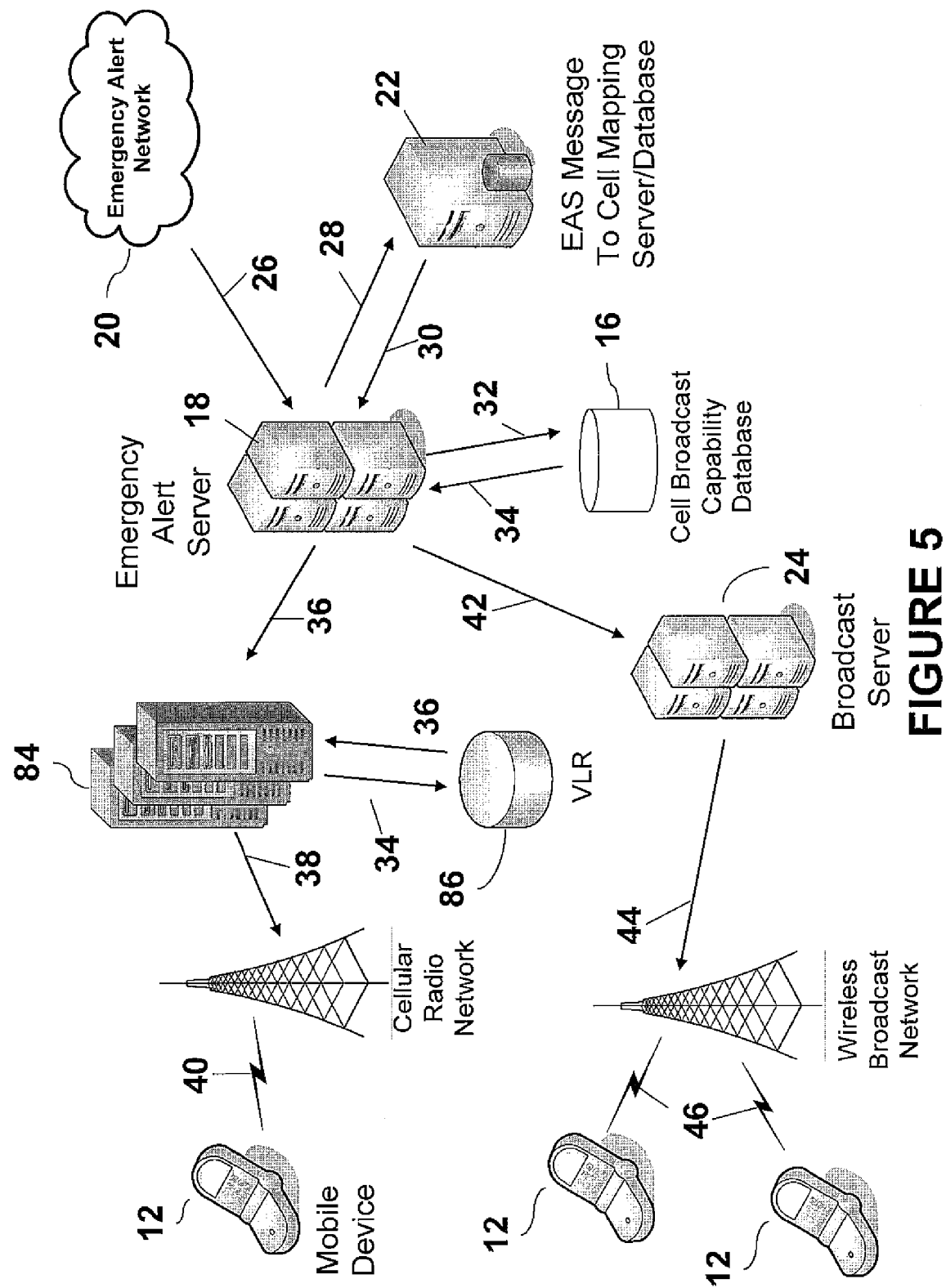
FIG. 5 is a flow diagram of another example process and system for delivering an alert message.

FIG. 5 is a flow diagram of another example process and system for delivering an alert message comprising another example process and system for delivering an SMS based alert message to cell sites in an alert area not capable of supporting broadcast technologies. As depicted in FIG. 5, delivery of the SMS based alert message utilizes MSCs 84 and visitor location register, VLR 86. A VLR, as described in more detail below, comprises information, stored therein, about all the mobile devices currently registered within the area of coverage (jurisdiction) of an associated MSC.

Figure 6:
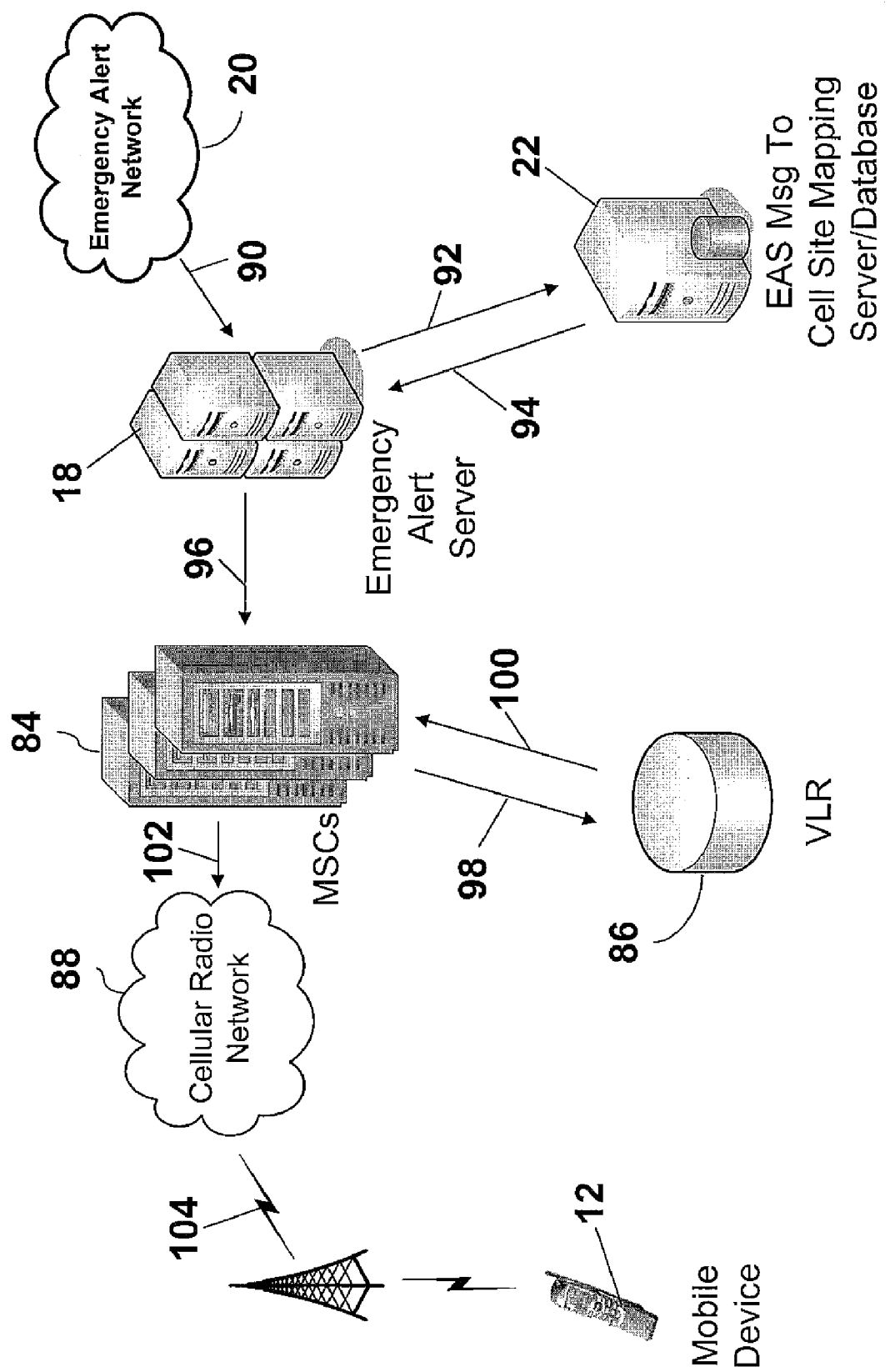
FIG. 6 is a more detailed flow diagram of yet another example process and system for delivering an SMS based alert message.

FIG. 6 is a more detailed flow diagram of another example process and system for delivering an SMS based alert message, utilizing MSC based routing, to cell sites in an alert area not capable of supporting broadcast technologies. At step 90, an Emergency Alert Network 20 issues an emergency alert for a alert area to an Emergency Alert Server 18. In an example embodiment, the emergency alert message comprises an indication of the alert area. At step 92, the Emergency Alert Server 18 provides a request to the mapping server 22 and MSCs associated with the alert area. The mapping server 22 determines (e.g., maps, translates) cell IDs (cell sites) and MSCs capable of providing cellular coverage to the alert area. In various example embodiments, as described in more detail below, cell IDs capable of providing coverage to the geographic alert area can be determined statically and/or dynamically.

The mapping server 22, at step 94, provides to the Emergency Alert Server 18, an indication of cell IDs and MSCs capable of providing cellular coverage to the alert area. In an example embodiment, the mapping server 22 provides to the Emergency Alert Server 18, a list of cell IDs and a list of MSCs 84 capable of providing cellular coverage to the alert area. As described in more detail below, an MSC performs switching functions and manages communications between mobile devices, such as mobile device 12 for example. Thus, each MSC in a network, such as the global system for mobile communications (GSM) for example, has associated therewith, a plurality of cell IDs, or cell sites.

At step 96, the Emergency Alert Server 18 provides, to each MSC 16 provided by the mapping server 22 (at step 92), an indication of the alert message and an indication of the cell IDs in the alert area and associated with the respective MSC 84. Note, it is possible for a MSC 84 to have associated therewith cell IDs, some of which are capable of providing cellular coverage to the alert area and some of which are not capable of providing cellular coverage to the alert area. Thus, in an example embodiment, at step 96, the Emergency Alert Server, provides to each MSC 84 on the list provided by the mapping server 22 (at step 92), the alert message and the list of cell IDs for a respective MSC 84 that are within the alert area. For example, if the mapping server 22 provided (at step 92) cell IDs associated with a single MSC 84, the Emergency Alert Server 18, would provide, at step 96, an indication of cell IDs associated with that single MSC 84. If, however, the mapping server 22 provided (step 92) cell IDs associated with a dozen MSCs 84, the Emergency Alert Server 18, would provide, at step 96, to each of the dozen MSCs 84, an indication of cell IDs associated with the respective MSC 84.

At step 98, each MSC 84 queries its associated visitor location register, VLR, 86 for subscribers currently registered in each cell ID associated with the respective MSC 84 and capable of providing cellular coverage to the alert area. A VLR, as described in more detail below, comprises information, stored therein, about all the mobile devices currently registered within the area of coverage (jurisdiction) of an associated MSC.

The VLR 86, searches its database and returns, at step 100, to the MSC 84, a list of subscribers who are currently registered with the respective cell ID. For each subscriber identified in the list provided by the VLR 86 (at step 100), the respective MSC 84 provides, to the Cellular Radio Network 88, an SMS based alert message indicative of the alert. The Cellular Radio Network 88, provides, at step 104, to each respective mobile device 12, the SMS based alert message.

Figure 7:
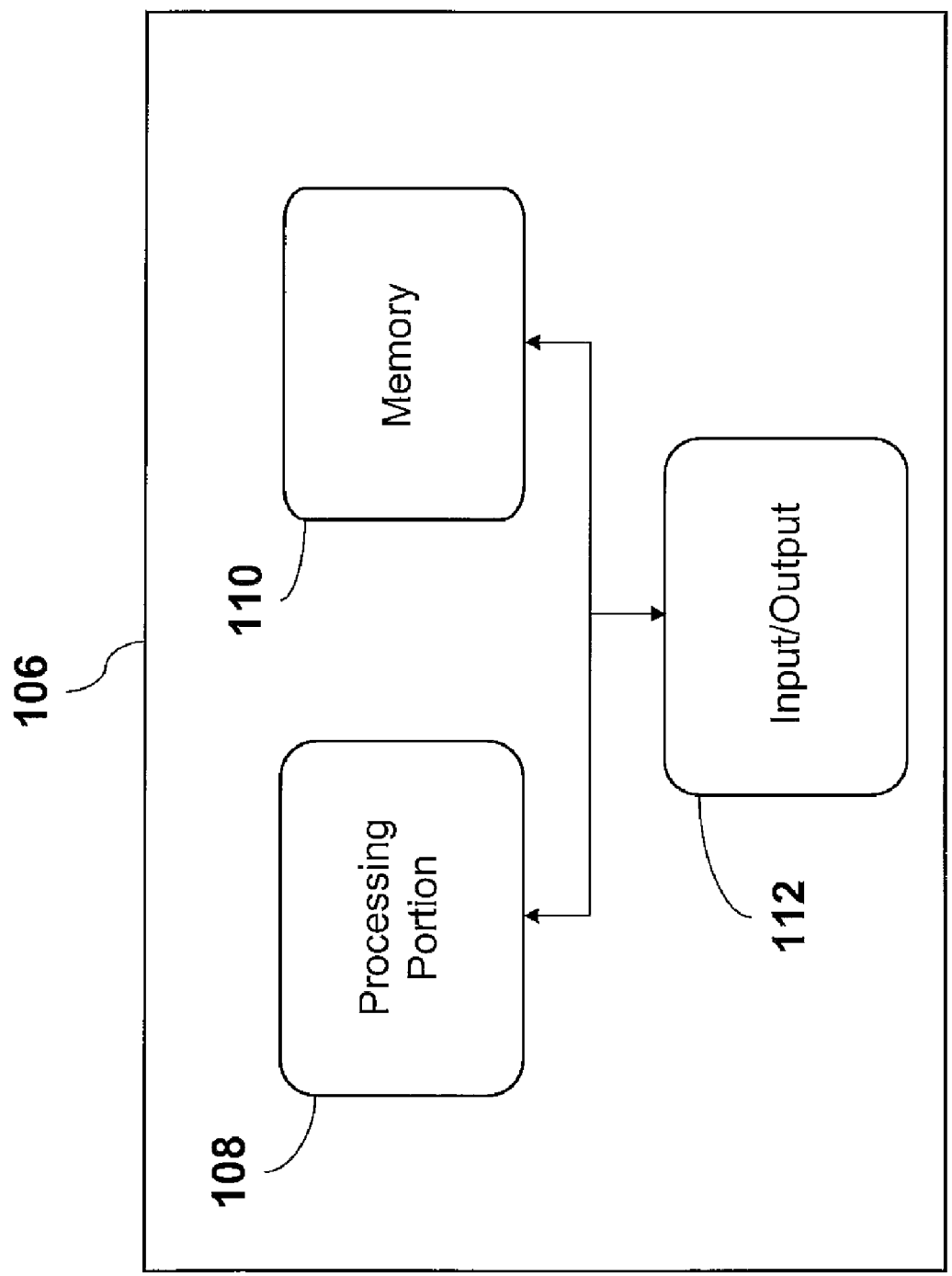
FIG. 7. is a block diagram of an exemplary system for determining a delivery mechanism for an alert message.

FIG. 7 is a block diagram of an exemplary system 106 for determining a delivery mechanism for an alert message. The system 16 comprises a processor portion 108, a memory portion 110, and an input/output portion 112. It is emphasized that the block diagram depicted in FIG. 7 is exemplary and not intended to imply a specific implementation. Thus, the system 106 can be implemented in a single processor or multiple processors. Multiple processors can be distributed or centrally located. Multiple processors can communicate wirelessly, via hard wire, or a combination thereof. The processor 106 can comprise any appropriate device for providing communication mode information. Examples of appropriate devices include mobile communications devices, mobile telephones, personal digital assistants (PDAs), lap top computers, handheld processors, or a combination thereof.

In various example embodiments, the system 106 can comprise, as described above, an MSC, an HLR, an Emergency Alert Server, an SMSC, a cell broadcast capability database, a broadcast server, an SMSC, a mapping server, or a combination thereof. Accordingly, the system 106 can, in various embodiments, perform the functions associated with each of an MSC, an HLR, an Emergency Alert Server, an SMSC, a cell broadcast capability database, a broadcast server, an SMSC, a mapping server, or a combination thereof.

As described above, cell sites providing coverage to the geographic alert area can be determined statically and/or dynamically. Alert notifications are directed to cell sites within an alert area in accordance with a mapping mechanism that identifies cell coverage within the area. Alert area definitions are mapped to associated cell sites such that emergency alerts can be delivered to subscribers within the alert area. In an example embodiment, alert areas are statically defined in accordance with geographic code references such as the Federal Information Processing Standard (FIPS), ZIP codes, and/or the National Weather Service Specific Area Message Encoder (SAME) codes. Radio Frequency (RF) propagation characteristics are determined for the areas, and used to determine if an area is capable of receiving an emergency alert notification. In another example embodiment, alert areas are defined dynamically in accordance with the Geographic Information System (GIS) Alert Mapping Service.

Figure 8:
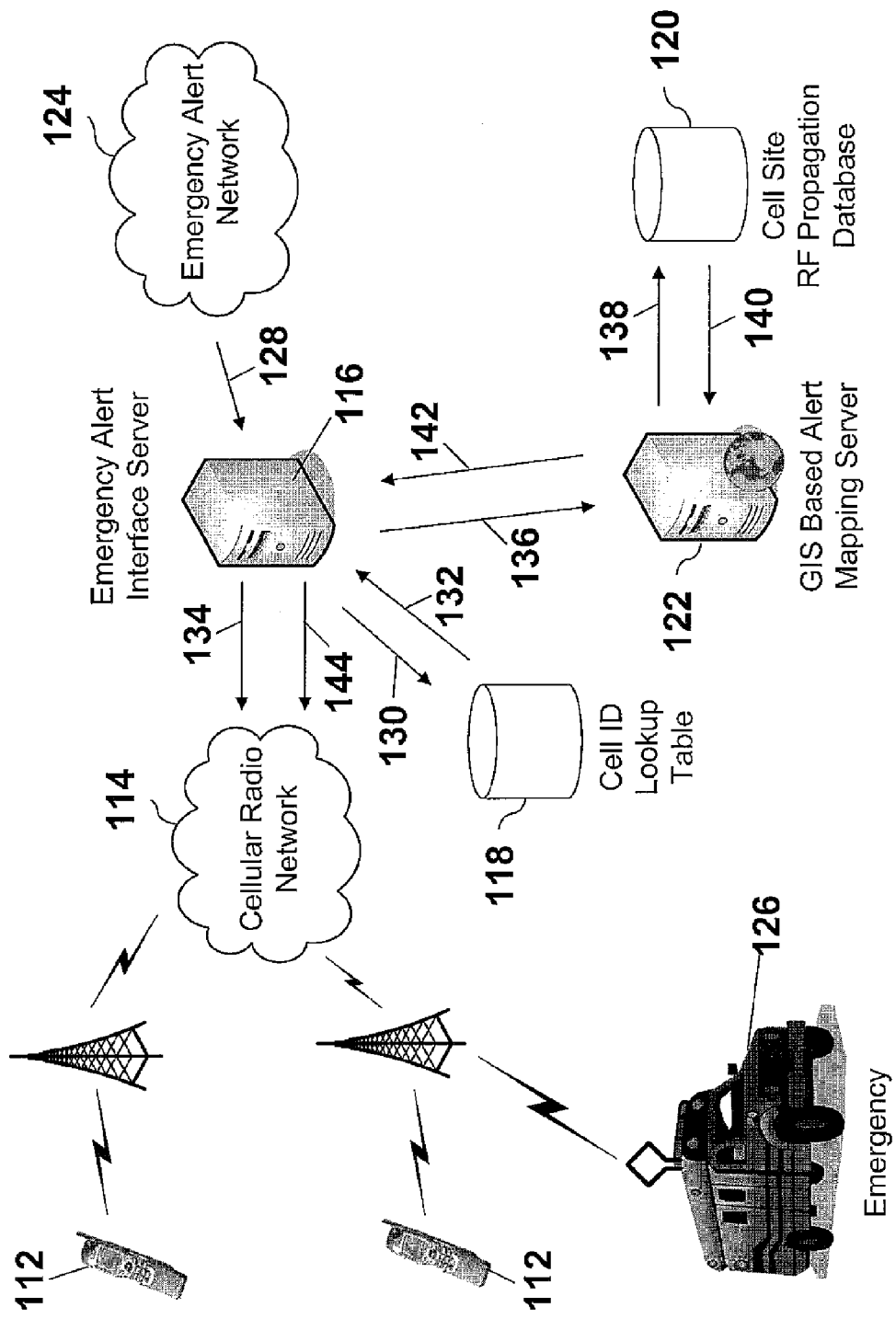
FIG. 8 is a flow diagram of an example process and system for statically defining an alert area and distributing an emergency alert.

FIG. 8 is a flow diagram of an example process and system for statically defining an alert area and distributing an emergency alert. At step 128, an Emergency Alert Network 124 issues an emergency alert for a statically defined alert area to an Emergency Alert Interface Server 116. In an example embodiment, the emergency alert message comprises an indication of a statically defined alert area. The alert area is statically defined in accordance with an appropriate geographic code reference, such as the Federal Information Processing Standard (FIPS) codes, ZIP codes, and/or the National Weather Service Specific Area Message Encoder (SAME) codes, for example. At step 130, the Emergency Alert Interface Server 116 requests, from a Cell ID Lookup Table 118, the list of all cell sites within the specified geographic code reference. In an example embodiment, the Cell ID Lookup Table 118 comprises information, for each cell site, pertaining to cell ID, cell location, associated ZIP code, associated FIPS code, associated SAME code, any other statically defined geographic code reference, or a combination thereof, for example.

Figure 9:
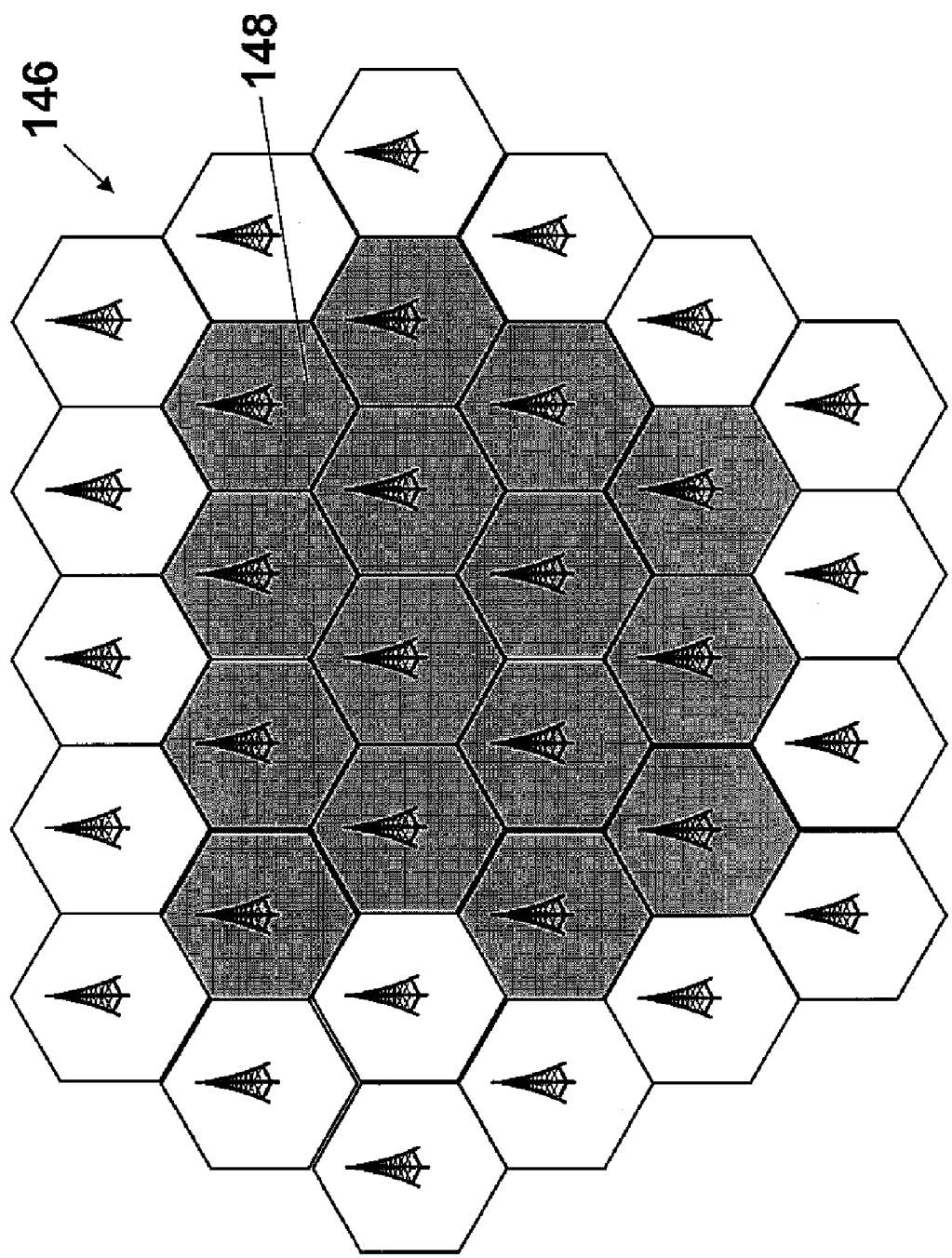
FIG. 9 is an example depiction of cell sites in an alert area.

FIG. 9 is an example depiction of cell sites in an alert area. Cell sites 146 represent example geographically contiguous cell sites capable of providing cellular coverage to the statically defined alert area and surrounding areas. Shaded cell sites 148 represent cell sites found in the Cell ID Lookup Table 118 associated with the statically defined alert area. Note, only one shaded cell site is labeled 148 for the sake of simplicity. Cell sites 148, associated with the specified geographic code reference(s), are retrieved from the Cell ID Lookup Table 118 and, at step 132 (FIG. 8), the list of found cell IDs indicative thereof, is returned to the Emergency Alert Interface Server 116.

Referring again to FIG. 8, at step 134, the emergency alert message and the associated list of Cell IDs are forwarded by the Emergency Alert Interface Server 116 to the cellular radio network 114 for distribution to the subscribers 112 via technologies used for delivery of emergency alert messages (e.g., SMS, Cell Broadcast, Multimedia Broadcast/Multicast Service ("MBMS"), and/or video broadcast, such as Digital Video broadcast-Handheld ("DVB-H"), IP Multicast, and MediaFLO)), and the like. At step 136, the Emergency Alert Interface Server 116 forwards the list of Cell IDs for the alert area to a Geographic Information System (GIS) based Alert Mapping Server 122. The GIS based Alert Mapping Server 122, identifies the geographic areas within the alert area which do not have any cellular coverage. In an example embodiment, step 136 occurs concurrently with, or approximately concurrently with, step 134. That is, the Emergency Alert Interface Server 116 provides the emergency alert message and the associated list of Cell IDs to the Cellular radio network 114 and provides the list of Cell IDs for the alert area to the GIS based Alert Mapping Server 122 at approximately the same time, or as close to the same time as is reasonably practicable.

At step 138, the GIS based Alert Mapping Server 122 requests, from a Cell Site Radio Frequency (RF) Propagation Database 120, the RF propagation characteristics for each cell site within the list of Cell IDs for the alert area. The Cell Site RF Propagation Database 120 retrieves, and/or determines, the RF propagation characteristics for each cell site in the list of Cell IDs for the alert area. At step 140, the Cell Site RF Propagation Database 120 returns, to the GIS based Alert Mapping Server 122, the RF propagation characteristics for each cell site. The RF Propagation Database 120 can comprise any appropriate means for retrieving and/or determining propagation characteristics. For example, the RF Propagation Database 120 can comprise a software program that is executed in response to a request for RF propagation characteristics. The software program embodiment of the RF Propagation Database 120 can reside in any appropriate processor, such as the GIS based Alert Mapping Server 122, for example. In an example embodiment, the GIS based Alert Mapping Server 122 comprises a mapping of Cell ID to input for the RF propagation software, e.g., latitude, longitude, and height of the cell site transmitter antenna, power output of the transmitters, and/or antenna characteristics such as gain, for example.

Figure 10:
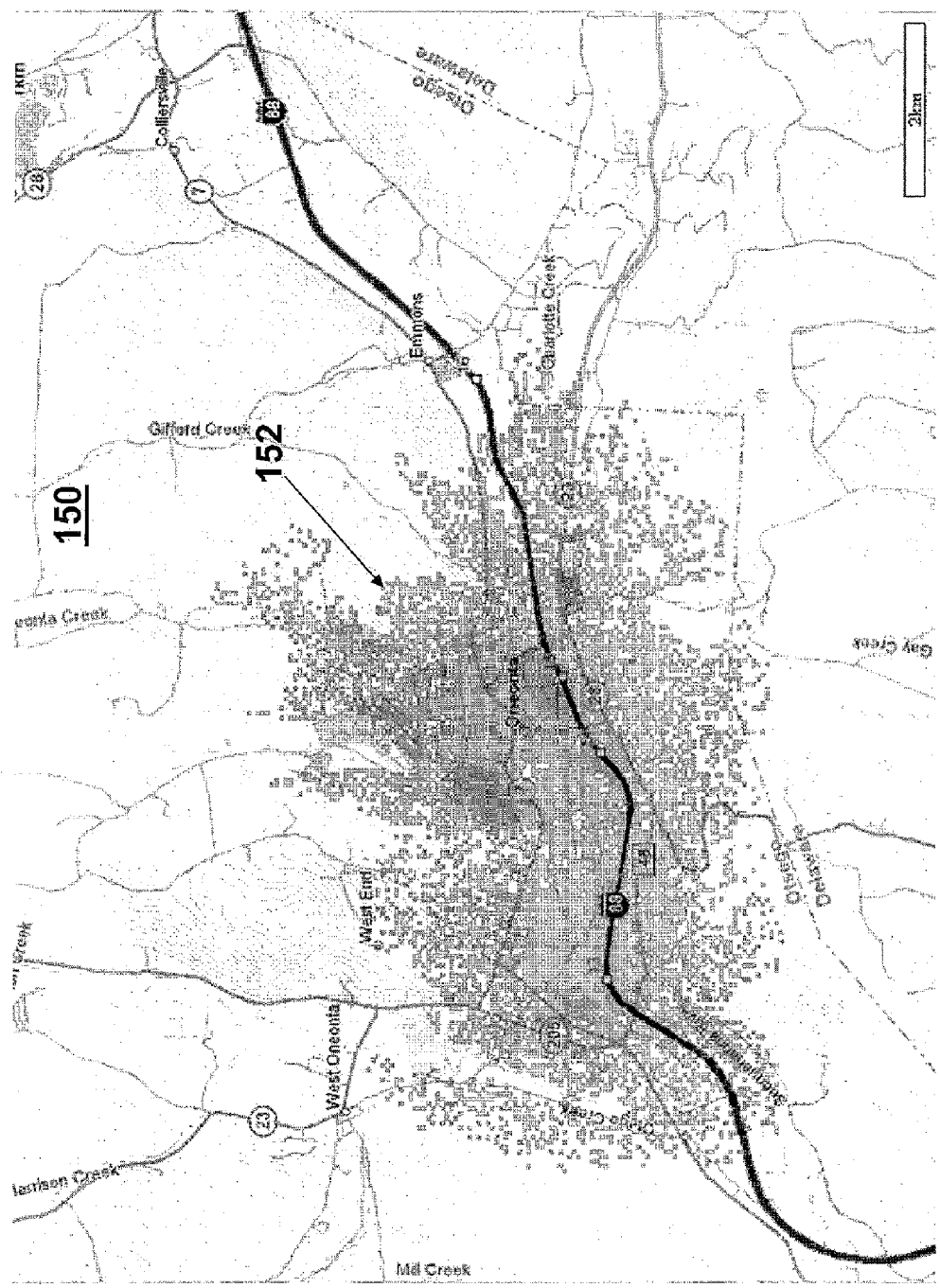
FIG. 10 is a depiction of an example area RF Propagation map.
Figure 11:
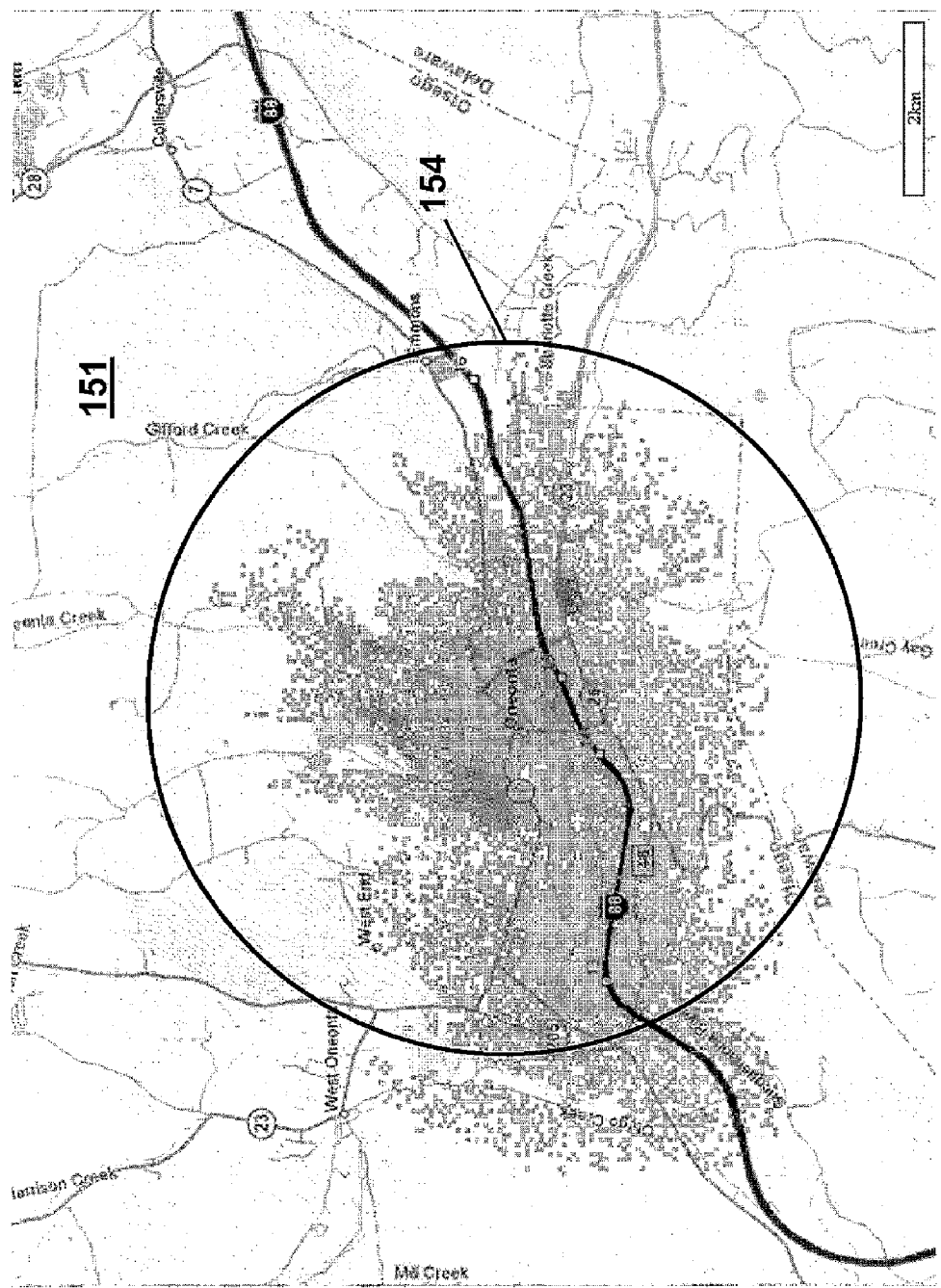
FIG. 11 is a depiction of an example alert area RF Propagation map.
Figure 12:
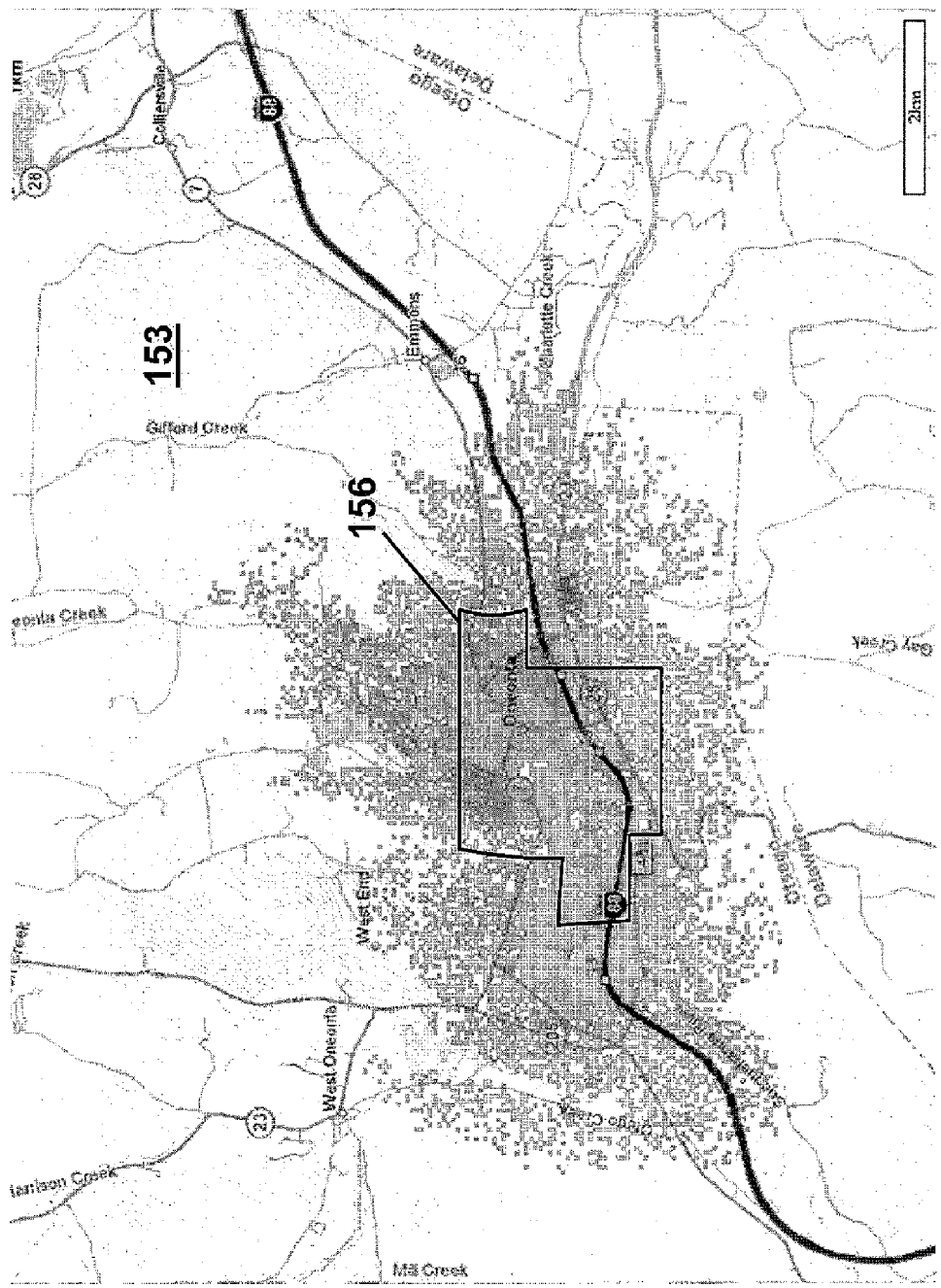
FIG. 12 is yet another depiction of an example alert area RF Propagation map.

FIG. 10 is a depiction of an example Area RF Propagation Map 150. The Cell Site RF Propagation Database 120 provides characteristics of each cell site and surrounding territory. An example of the output of the Cell Site RF Propagation Database 120 in the form of a map is depicted in FIG. 10. This map is referred to herein as the Area RF Propagation Map. The Area RF Propagation Map 150 provides an indication of RF propagation characteristics 152, shaded in grey in FIG. 10, for the alert area and areas proximate to the alert area. In an example embodiment, the RF propagation characteristics are color coded to provide an indication of RF characteristics. The GIS based Alert Mapping Server 122 combines, into one map, the RF characteristics of each cell site with the GIS definition of the alert area and surrounding territory. In an example embodiment, the alert area is represented by geometric patterns such as a circle, oval, polygon, or the like overlaid the Area RF propagation map. Example overlaid geometric patterns indicative of alerts areas are depicted in FIG. 11 as area 154 in the Alert Area RF Propagation Map 151, and in FIG. 12 as area 156 in the Alert Area RF Propagation Map 153. By providing RF propagation characteristics, the Alert Area RF Propagation Map, such as Alert Area RF Propagation Maps 151 and 152, provides an indication of geographic areas, within the alert area, that have, and do not have, cellular coverage.

Referring again to FIG. 8, at step 142, the Alert Area RF Propagation Map, with appropriate overlays, is forwarded to the Emergency Alert Server 116 for distribution (step 144) to the appropriate emergency event command personnel 126 associated with the emergency (e.g., Incident Commander at the scene). The Alert Area RF Propagation Map can be distributed via any appropriate means, such as the cellular radio network 114 or any other available networks such as the Internet, for example. Upon receipt of the Alert Area RF Propagation Map 150, the Incident Commander can determine areas in which the public may not be able to receive the emergency alert via a wireless device. Accordingly, the Incident Commander can provide warning of the emergency via any appropriate alerting method, place portable cell towers where needed, or the like.

Figure 13:
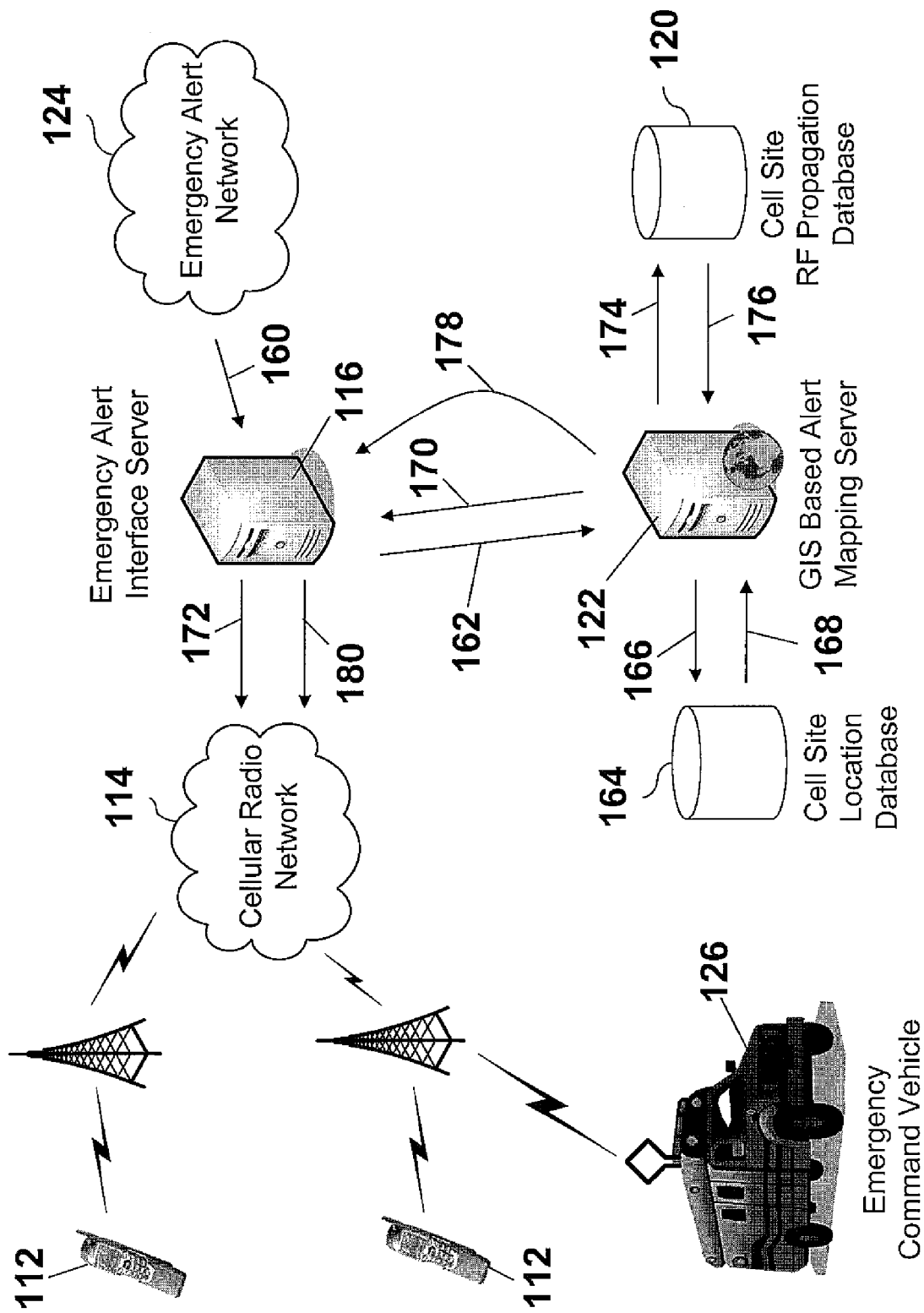
FIG. 13 is a flow diagram of an example process and system for dynamically defining an alert area and distributing an emergency alert.

FIG. 13 is a flow diagram of an example process and system for dynamically defining an alert area and distributing an emergency alert. At step 160, the Emergency Alert Network 124 issues an emergency alert for a dynamically defined alert area to the Emergency Alert Interface Server 116. In an example embodiment, the description of the dynamically defined alert area is formatted in accordance with a World Geodetic System 1984 (WGS-84) format, or the like. The WGS-84 defines a fixed global reference frame for the Earth.

In an example configuration, geographic areas are defined by geometric shapes, such as circles, ovals, and/or polygons, or the like. At step 162, the Emergency Alert Interface Server 116 provides the dynamically defined alert area to the GIS based Alert Mapping Server 122. The GIS based Alert Mapping Server 122, at step 166, requests from a Cell Site Location Database 164, all cell sites which are contained within the boundaries of the alert area. In an example embodiment, the cell sites within the boundaries of the alert area are determined in accordance with the location, such as latitude and longitude, of respective cell sites.

The Cell Site Location Database 164 can comprise any appropriate database. In an example embodiment, the Cell Site Location Database 164 comprises information pertaining to cell sites such as a cell ID of each cell site and a cell location (e.g., latitude and longitude) of each cell site, for example. Upon receiving the request (step 166) from the GIS based Alert Mapping Server 122, the Cell Site Location Database 164 identifies all cell sites associated with the specified dynamically defined alert area. At step 168, the Cell Site Location Database 164 provides, to the GIS based Alert Mapping Server 122, the list of identified cell sites. In an example embodiment, the list comprises a Cell ID for each identified cell site associated with the dynamically defined alert area. In another example embodiment, the list also comprises the cell location of each identified cell site.

Figure 14:
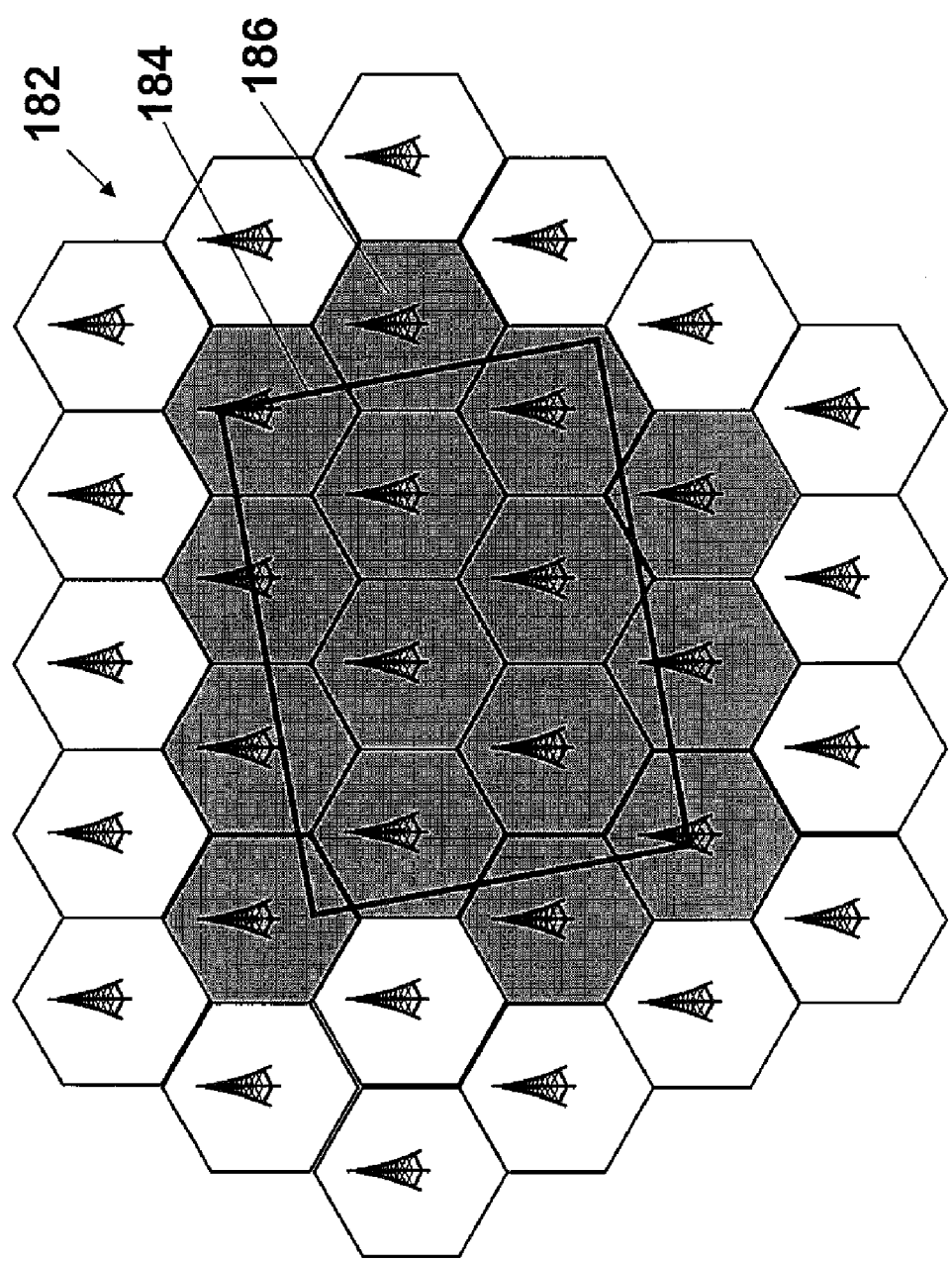
FIG. 14 is an example depiction of cell sites identified for a dynamically defined emergency alert area.

FIG. 14 is an example depiction of cell sites identified for a dynamically defined emergency alert area. Cell sites 182 represent example geographically contiguous cell sites capable of providing cellular coverage to the dynamically defined alert area and surrounding areas. Polygon 184 represents the dynamically defined emergency alert area. Shaded cell sites 186 represent identified cell sites (e.g., identified by the Cell Site Location Database 164) associated with (e.g., providing coverage to) the dynamically defined alert area 184. Note, only one shaded cell site is labeled 186 for the sake of simplicity.

Referring again to FIG. 13, the GIS based Alert Mapping Server 122, at step 170, provides to the Emergency Alert Interface Server 116, a list of the identified cell sites associated the dynamically defined alert area. In an example embodiment, the list comprises at least the Cell ID for each identified cell site associated with the dynamically defined alert area. At step 172, the Emergency Alert Interface Server 116, provides to the Cellular radio network 114, the emergency alert message and the list of associated Cell IDs for the dynamically defined alert area. Via the Cellular radio network 114, the emergency alert message can be distributed to the subscribers 112 via technologies used for delivery of emergency alert messages (e.g., SMS, Cell Broadcast, Multimedia Broadcast/Multicast Service ("MBMS"), and/or video broadcast, such as Digital Video broadcast-Handheld ("DVB-H"), IP Multicast, and MediaFLO)), and the like.

At step 174, the GIS based Alert Mapping Server 122, requests, from the Cell Site RF Propagation Database 120, the RF propagation characteristics for each cell site within the list of Cell IDs for the alert area. In an example embodiment, step 174 occurs concurrently with, or approximately concurrently with, step 172. That is, the Emergency Alert Interface Server 116 provides the emergency alert message and the associated list of Cell IDs to the Cellular radio network 114 and requests, from the Cell Site RF Propagation Database 120, the RF propagation characteristics for each cell site within the list of Cell IDs for the alert area, at approximately the same time, or as close to the same time as is reasonably practicable. The Cell Site RF Propagation Database 120 retrieves, and/or determines, the RF propagation characteristics for each cell site in the list of Cell IDs for the alert area. At step 176, the Cell Site RF Propagation Database 54 returns, to the GIS based Alert Mapping Server 122, the RF propagation characteristics for each cell site. The RF Propagation Database 120 can comprise any appropriate means for retrieving and/or determining propagation characteristics. For example, the RF Propagation Database 120 can comprise a software program that is executed in response to a request for RF propagation characteristics. The software program embodiment of the RF Propagation Database 120 can reside in any appropriate processor, such as the GIS based Alert Mapping Server 122, for example. In an example embodiment, the GIS based Alert Mapping Server 56 comprises a mapping of Cell ID to input for the RF propagation software, e.g., latitude, longitude, and height of the cell site transmitter antenna, power output of the transmitters, and/or antenna characteristics such as gain, for example.

The Cell Site RF Propagation Database 120 provides characteristics of each cell site and surrounding territory. An example of the output of the Cell Site RF Propagation Database 120 in the form of a map is depicted in FIG. 10. The Area RF Propagation Map 150 provides an indication of RF propagation characteristics 152, shaded in grey in FIG. 10, for the alert area and areas proximate to the alert area. In an example embodiment, the RF propagation characteristics are color coded to provide an indication of RF characteristics. The GIS based Alert Mapping Server 122 combines, into one map, the RF characteristics of each cell site with the GIS definition of the alert area and surrounding territory. In an example embodiment, the alert area is represented by geometric patterns such as a circle, oval, polygon, or the like overlaid the Area RF propagation map. Example overlaid geometric patterns indicative of alerts areas are depicted in FIG. 11 as area 154 in the Alert Area RF Propagation Map 151, and in FIG. 12 as area 156 in the Alert Area RF Propagation Map 153. By providing RF propagation characteristics, the Alert Area RF Propagation Map, such as Alert Area RF Propagation Maps 151 and 153, provides an indication of geographic areas, within the alert area, that have, and do not have, cellular coverage.

Referring again to FIG. 13, at step 178, the Alert Area RF Propagation Map, with appropriate overlays, is forwarded to the Emergency Alert Server 116 for distribution (step 180) to the appropriate emergency event command personnel 126 associated with the emergency (e.g., Incident Commander at the scene). The Alert Area RF Propagation Map can be distributed via any appropriate means, such as the cellular radio network 114 or any other available networks such as the Internet, for example. Upon receipt of the Alert Area RF Propagation Map, the Incident Commander can determine areas in which the public may not be able to receive the emergency alert via a wireless device. Accordingly, the Incident Commander can provide warning of the emergency via any appropriate alerting method, place portable cell towers where needed, or the like.

Figure 15:
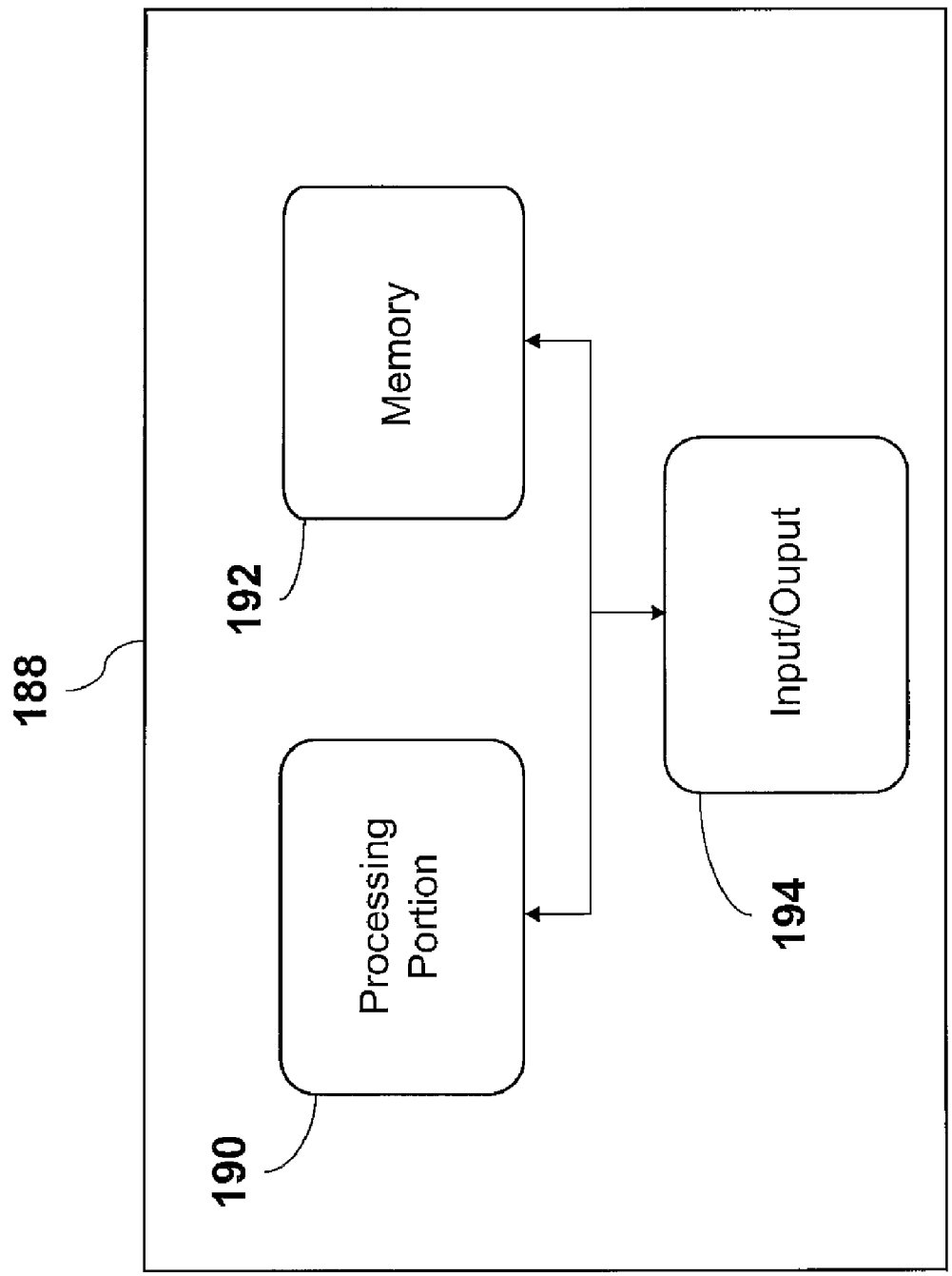
FIG. 15 is a block diagram of an exemplary system for mapping cellular coverage to an alert area.

FIG. 15 is a block diagram of an exemplary system 188 for mapping cellular coverage to an alert area. The processor 188 comprises a processor portion 190, a memory portion 192, and an input/output portion 194. It is emphasized that the block diagram depicted in FIG. 8 is exemplary and not intended to imply a specific implementation. Thus, the system 118 can be implemented in a single processor or multiple processors. Multiple processors can be distributed or centrally located. Multiple processors can communicate wirelessly, via hard wire, or a combination thereof. The processor 84 can comprise any appropriate device for providing communication mode information. Examples of appropriate devices include mobile communications devices, mobile telephones, personal digital assistants (PDAs), lap top computers, handheld processors, or a combination thereof.

In various example embodiments, the system 188 can comprise the Emergency Alert Interface Server 116, the GIS based Alert Mapping Server 122, The Cell Site Location Database 164, The Cell Site RF Propagation Database 120, the Cell ID Lookup Table 118, or a combination thereof. Accordingly, the system 188 can, in various embodiments, perform the functions associated with each of the Emergency Alert Interface Server 116, the GIS based Alert Mapping Server 122, The Cell Site Location Database 164, The Cell Site RF Propagation Database 120, the Cell ID Lookup Table 118, or a combination thereof.

In various example embodiments, the input/output portion 194 is capable of receiving and/or providing: an emergency alert for a statically defined alert area, an emergency alert for a dynamically defined alert area, a list of cell sites within a specified geographic code reference, an emergency alert message, a Cell ID, RF propagation characteristics, an Alert Area Propagation Map, or a combination thereof, for example.

In various embodiments, the processor portion 190 is capable of: generating an Alert Area Propagation Map, determining RF propagation characteristics, determining a Cell ID for a cell site, identifying cell sites associated with a statically defined alert area, identifying cell sites associated with a dynamically defined alert area, determining a geographic area within an alert area (statically or dynamically defined) that has cellular coverage, determining a geographic area within and alert area (statically or dynamically defined) that does not have cellular coverage, or a combination thereof, for example. In various example embodiments, the memory portion 192 is capable of storing information associated with mapping cellular coverage to alert areas.

The cellular radio network and/or the wireless broadcast network depicted herein can comprise any appropriate telephony radio network. The Emergency Alert Network depicted herein can comprise any appropriate emergency alert network, such as a telephony radio network, for example. Further, techniques for the delivery of emergency alerts can be implemented with appropriate telephony radio networks. The following description sets forth some exemplary telephony radio networks, such as the global system for mobile communications (GSM), and non-limiting operating environments. The below-described operating environments should be considered non-exhaustive, however, and thus the below-described network architectures merely show how techniques for the delivery of emergency alerts can be incorporated with existing network structures and architectures. It can be appreciated, however, that the techniques for the delivery of emergency alerts can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the determination of EAS delivery can be applied independently of the method of data transport, and do not depend on any particular network architecture, or underlying protocols.

Figure 16:
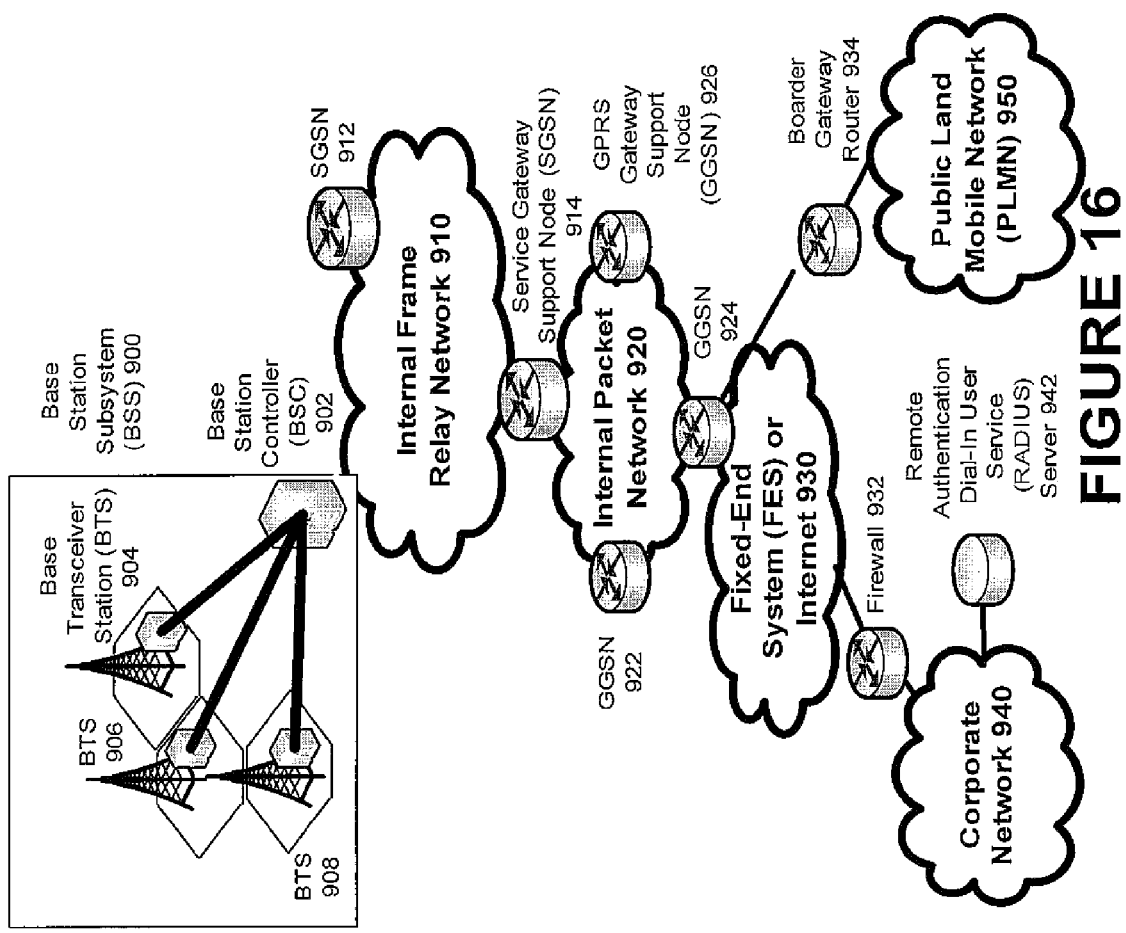
FIG. 16 depicts an overall block diagram of an exemplary packet-based mobile cellular network environment, such as a GPRS network.

FIG. 16 depicts an overall block diagram of an exemplary packet-based mobile cellular network environment, such as a GPRS network, in which the various determination mechanisms for delivery of alert messages can be practiced. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices (e.g., mobile device 12) become connected to the wireless network. In exemplary fashion, the packet traffic originating from user devices (e.g., user device 20) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 17:
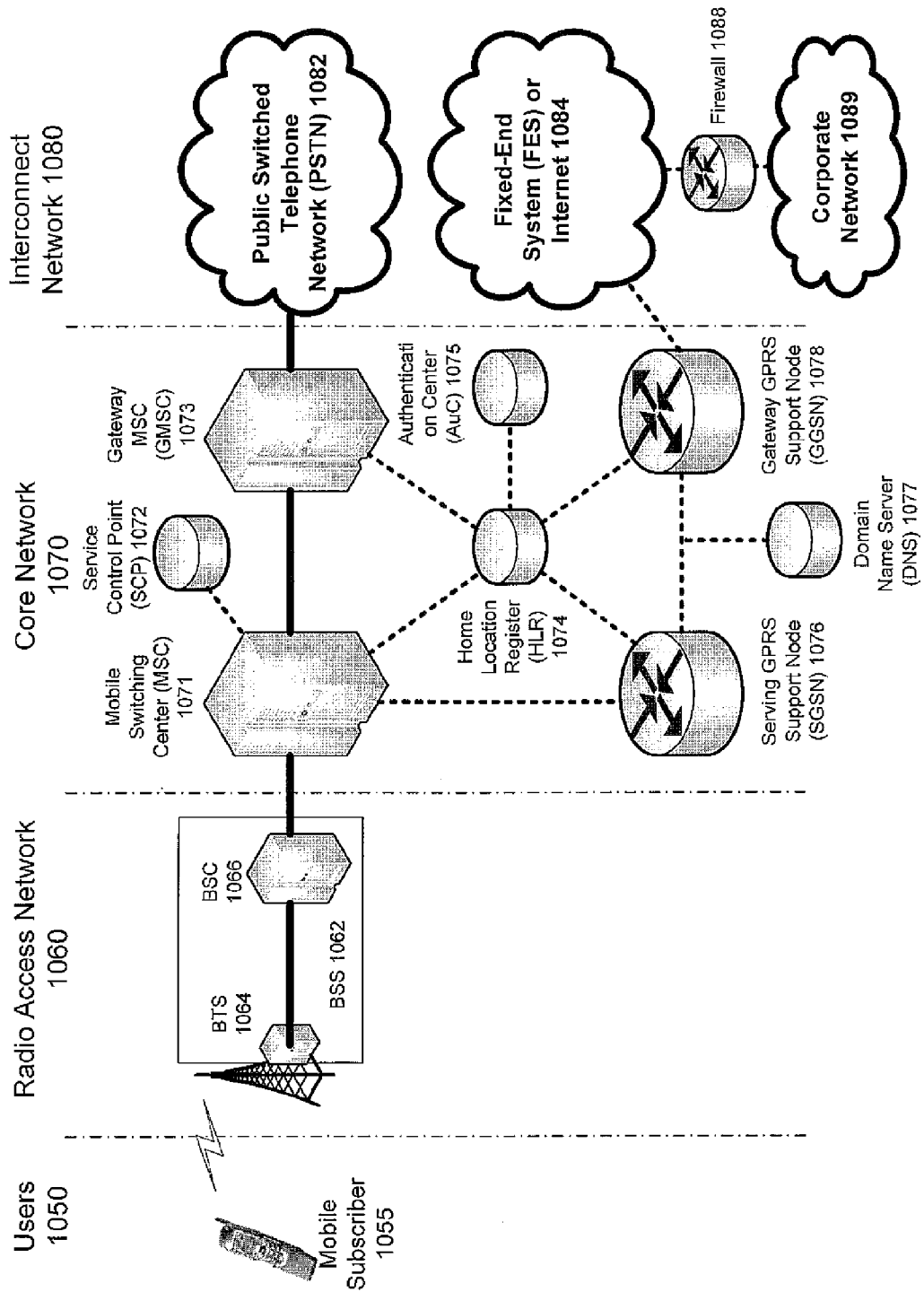
FIG. 17 depicts an architecture of a typical GPRS network as segmented into four group.

FIG. 17 illustrates an architecture of a typical GPRS network as segmented into four groups: users 1050, radio access network 1060, core network 1070, and interconnect network 1080. Users 1050 comprise a plurality of end users (though only mobile subscriber 1055 is shown in FIG. 17). In an example embodiment, the device depicted as mobile subscriber 1055 comprises mobile device 12. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 17, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user, such as the user having a disability for example, and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 17, when mobile subscriber 1055 initiates the attach process by turning on the network capabilities of the mobile device, an attach request is sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 requests more information from mobile subscriber 1055. This information is used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1055 was attached before, to cancel the location process for mobile subscriber 1055. HLR 1074 then notifies SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1055. The mobile subscriber 1055 uses an algorithm to send the user identification (ID) and password to SGSN 1076. The SGSN 1076 uses the same algorithm and compares the result. If a match occurs, SGSN 1076 authenticates mobile subscriber 1055.

Next, the mobile subscriber 1055 establishes a user session with the destination network, corporate network 1089, by going through a Packet Data Protocol ("PDP") activation process. Briefly, in the process, mobile subscriber 1055 requests access to the Access Point Name ("APN"), for example, UPS.com, and SGSN 1076 receives the activation request from mobile subscriber 1055. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1055.

Once activated, data packets of the call made by mobile subscriber 1055 can then go through radio access network 1060, core network 1070, and interconnect network 1080, in a particular fixed-end system or Internet 1084 and firewall 1088, to reach corporate network 1089.

Thus, network elements that can invoke the functionality of the emergency alert mapping system can include but are not limited to Gateway GPRS Support Node tables, Fixed End System router tables, firewall systems, VPN tunnels, and any number of other network elements as required by the particular digital network.

Figure 18:
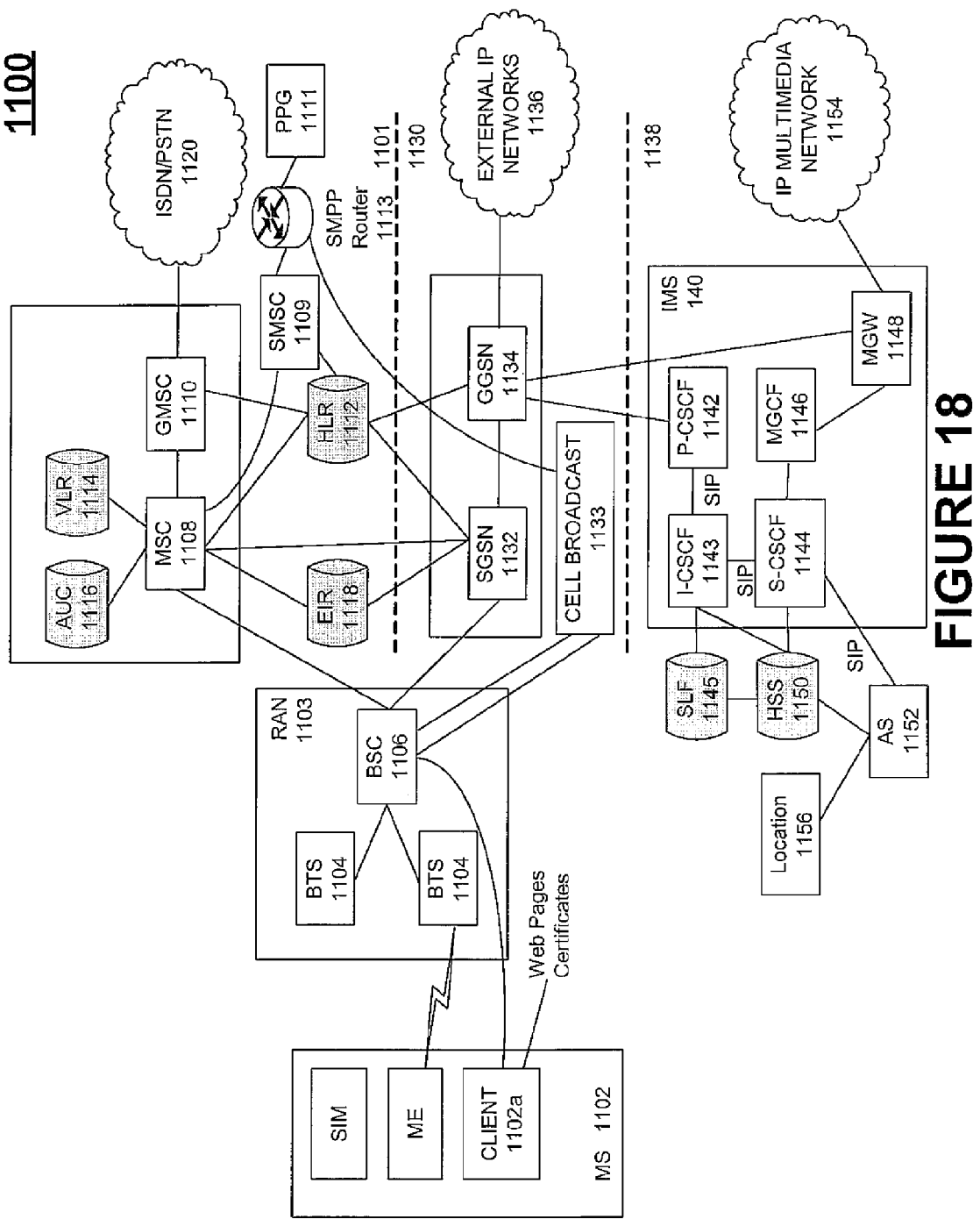
FIG. 18 illustrates another exemplary block diagram view of a GSM/GPRS/IP multimedia network architecture.

FIG. 18 illustrates another exemplary block diagram view of a GSM/GPRS/IP multimedia network architecture 1100 with which the various mechanisms for delivery of alert messages can be incorporated. As illustrated, architecture 1100 of FIG. 18 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of techniques for the delivery of emergency alerts have been described in connection with various computing devices/processor, the underlying concepts can be applied to any computing device, processor, or system capable delivering emergency alerts. The various techniques described herein can be implemented in connection with hardware or software or, where appropriate, with a combination of both. Thus, the methods and apparatuses for the various techniques for the delivery of emergency alerts, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for techniques for the delivery of emergency alerts. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for techniques for the delivery of emergency alerts also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing techniques for the delivery of emergency alerts. When implemented on a general-purpose processor, the program code combines with the processor to provide a unique apparatus that operates to invoke the functionality of the various techniques for the delivery of emergency alerts. Additionally, any storage techniques used in connection with the techniques for the delivery of emergency alerts can invariably be a combination of hardware and software.

While techniques for the delivery of emergency alerts have been described in connection with the various embodiments of the various figures, it is to be understood that other similar embodiments can be used or modifications and additions can be made to the described embodiment for performing the same function of the various techniques for the delivery of emergency alerts without deviating therefrom. For example, one skilled in the art will recognize that techniques for the delivery of emergency alerts as described in the present application may apply to any environment, whether wired or wireless, and may be applied to any number of such devices connected via a communications network and interacting across the network. Therefore, techniques for the delivery of emergency alerts should not be limited to any single embodiment, but rather should be construed in breadth and scope in accordance with the appended claims.

What is claimed:

1. A method for delivering an indication of an alert, the method comprising:
   receiving an indication of an alert for a geographic alert area;
   determining, via an emergency alert server, cellular sites configured to provide cellular coverage for the alert area;
   determining, via the emergency alert server and a cell mapping server, geographic areas within the alert area without cellular coverage;
   determining, of the cellular sites configured to provide cellular coverage for the alert area, cellular sites configured to support broadcast technology;
   determining broadcast sites configured to provide coverage for the alert area;
   determining, of the cellular sites configured to provide cellular coverage for the alert area, cellular sites incapable of supporting broadcast technology;
   broadcasting an indication of the alert via the broadcast sites configured to provide coverage for the alert area;
   broadcasting an indication of the alert, via a first set of cellular sites configured to:
      provide cellular coverage for the alert area; and
      supporting a broadcast technology; and
   providing a short message service (SMS) based indication of the alert via a second set of cellular sites:
      configured to provide cellular coverage for the alert area; and
      incapable of supporting broadcast technology.

2. A method in accordance with claim 1, for each cellular site of the second set of cellular sites, the method further comprising:
   determining if any cellular site of the second set of cellular sites is associated with a registered SMS subscriber wanting to receive an SMS based alert message; and
   providing an SMS based alert message indicative of the alert, to each cellular site of the second set of cellular sites that is associated with a registered SMS subscriber wanting to receive an SMS based alert message.

3. A method in accordance with claim 2, further comprising:
comparing a list of the cellular sites of the second set of cellular sites with a list of cellular sites that are associated with registered SMS subscribers wanting to receive an SMS based alert message; and
for each match resulting from the comparison, providing to each cellular site correspond to a match, an SMS based alert message indicative of the alert.

4. A method in accordance with claim 2, further comprising maintaining a current location of a registered subscriber.

5. A method in accordance with claim 1, wherein the indication of the alert comprises at least one of a statically defined geographic area of the alert or a dynamically defined geographic area of the alert.

6. A method in accordance with claim 1, wherein the indication of the alert comprises at least one of a subscriber ID, a mobile subscriber directory number, and an indication of the geographic area in which the subscriber registered.

7. A method in accordance with claim 6, wherein the indication of the geographic area in which the subscriber registered comprises an indication of a cell site with which the subscriber registered.

8. A method in accordance with claim 1, further comprising:
determining mobile switching centers (MSCs) capable of facilitating cellular coverage for the second set of cellular sites;
determining a cell ID for each determined MSC;
determining, for each determined cell ID, currently registered subscribers in a respective cell ID; and
providing, to each determined currently registered subscriber, an SMS based alert message indicative of the alert.

9. A method in accordance with claim 8, wherein at least one of the currently registered subscribers is a roaming subscriber.

10. A method in accordance with claim 8, further comprising, for each determined MSC, searching a database of registered subscribers to determine currently registered subscribers in a respective cell ID.

11. A method in accordance with claim 10, wherein a visitor location register comprises the database.

12. A method in accordance with claim 1, further comprising broadcasting the indication of the alert in accordance with at least one of: a cell broadcast, a multimedia broadcast\multicast service, video broadcast, a digital video broadcast.

13. A system for delivering an indication of an alert, the system comprising:
an input/output portion configured to:
receive an indication of an alert for a geographic alert area;
broadcast an indication of the alert, via a first set of cellular sites configured to:
provide cellular coverage for the alert area; and
supporting a broadcast technology;
broadcast an indication of the alert via broadcast sites configured to provide coverage for the alert area;
provide a short message service (SMS) based indication of the alert via a second set of cellular sites:
configured to provide cellular coverage for the alert area; and
incapable of supporting broadcast technology; and
a processor portion configured to:
determine, via an emergency alert server, cellular sites configured to provide cellular coverage for the alert area;
determine, via the emergency alert server and a cell mapping server, geographic areas within the alert area without cellular coverage;
determine, of the cellular sites configured to provide cellular coverage for the alert area, cellular sites configured to support broadcast technology;
determine, of the cellular sites configured to provide cellular coverage for the alert area, cellular sites incapable of supporting broadcast technology; and
determine broadcast sites configured to provide coverage for the alert area.

14. A system in accordance with claim 13, for each cellular site of the second set of cellular sites:
the processor portion further configured to:
determine if any cellular site of the second set of cellular sites is associated with a registered SMS subscriber wanting to receive an SMS based alert message; and
the input/output portion further configured to:
provide an SMS based alert message indicative of the alert, to each cellular site of the second set of cellular sites that is associated with a registered SMS subscriber wanting to receive an SMS based alert message.

15. A system in accordance with claim 14:
the processor portion further configured to:
compare a list of the cellular sites of the second set of cellular sites with a list of cellular sites that are associated with registered SMS subscribers wanting to receive an SMS based alert message; and
the input/output portion further configured to:
for each match resulting from the comparison, provide to each cellular site correspond to a match, an SMS based alert message indicative of the alert.

16. A system in accordance with claim 14, the processor portion further configured to maintain a current location of a registered subscriber.

17. A system in accordance with claim 13, wherein the indication of the alert comprises at lease one of a statically defined geographic area of the alert or a dynamically defined geographic area of the alert.

18. A system in accordance with claim 13, wherein the indication of the alert comprises at least one of a subscriber ID, a mobile subscriber directory number, and an indication of the geographic area in which the subscriber registered.

19. A system in accordance with claim 13:
the processor portion further configured to:
determine mobile switching centers (MSCs) capable of facilitating cellular coverage for the second set of cellular sites;
determine a cell ID for each determined MSC;
determine, for each determined cell ID, currently registered subscribers in a respective cell ID; and
the input/output portion further configured to:
provide, to each determined currently registered subscriber, an SMS based alert message indicative of the alert.

20. A system in accordance with claim 19, wherein at least one of the currently registered subscribers is a roaming subscriber.

* * * * *